May 24, 1966  E. A. CRAWFORD  3,252,415
ZONED TENSION CONTROL FOR PRINTING PRESS
Filed July 9, 1962  33 Sheets-Sheet 3

INVENTOR.
EARL A. CRAWFORD
BY
ATTORNEY

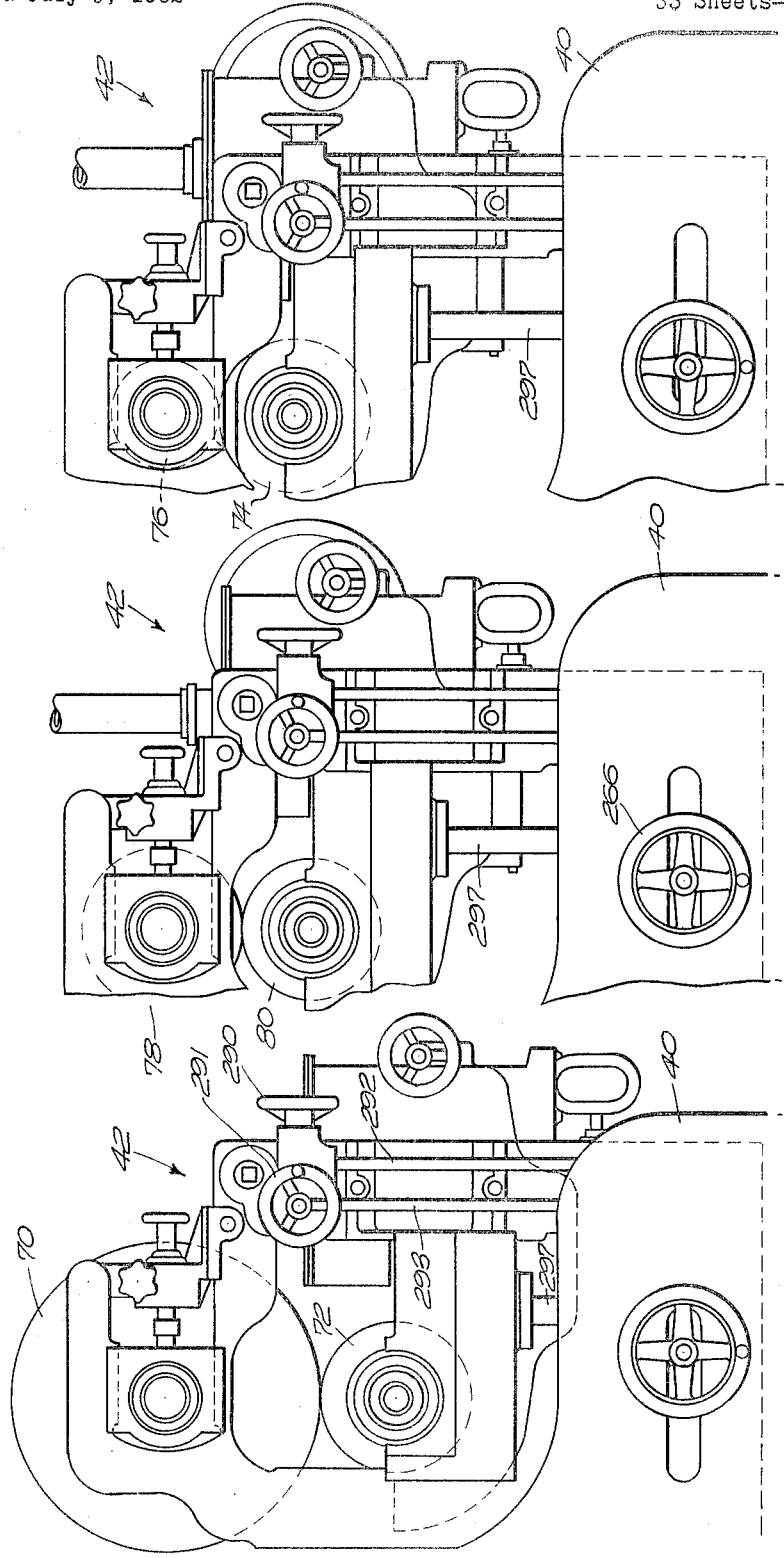

INVENTOR.
EARL A. CRAWFORD
BY Max Schwartz
ATTORNEY

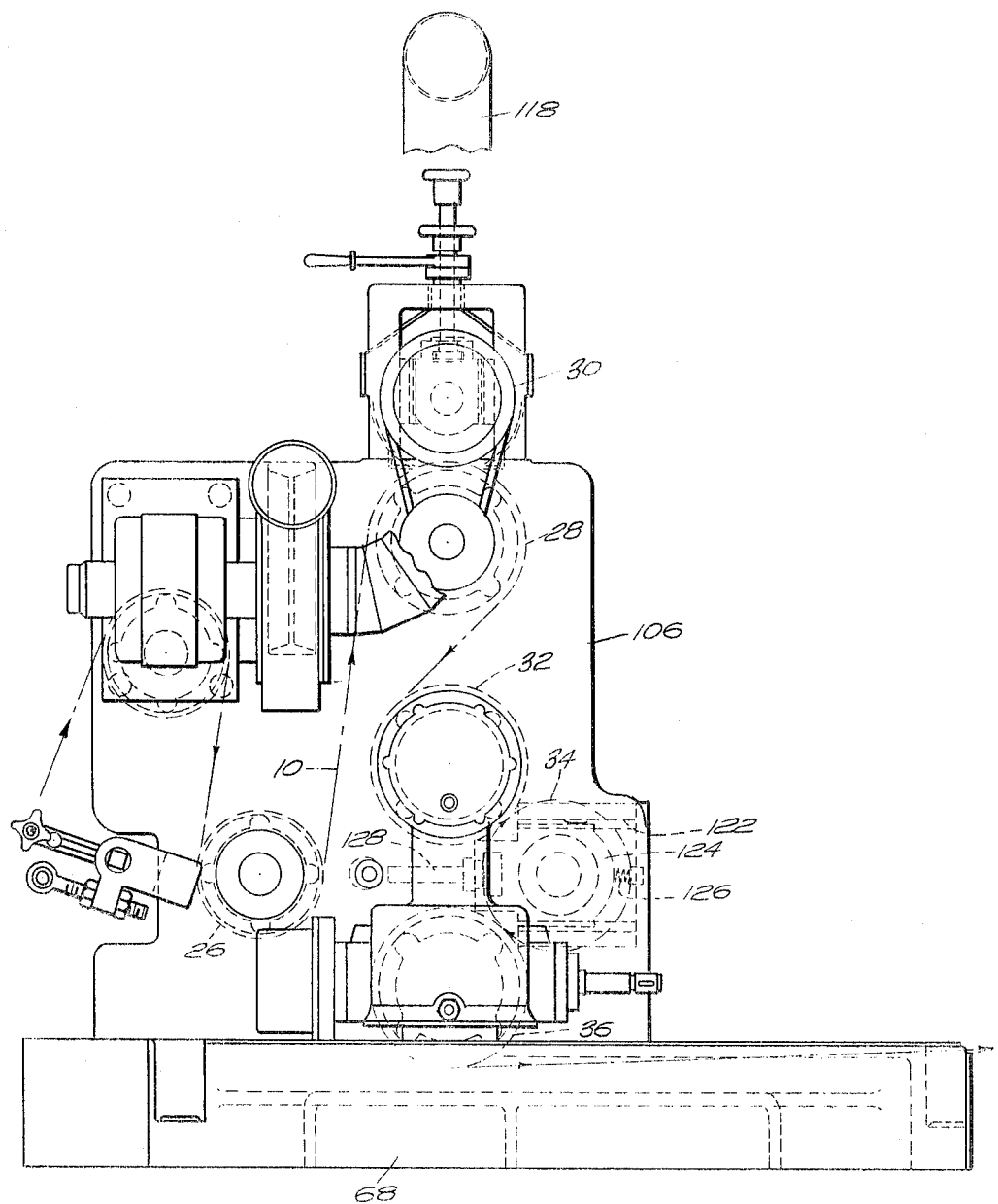
FIG. II

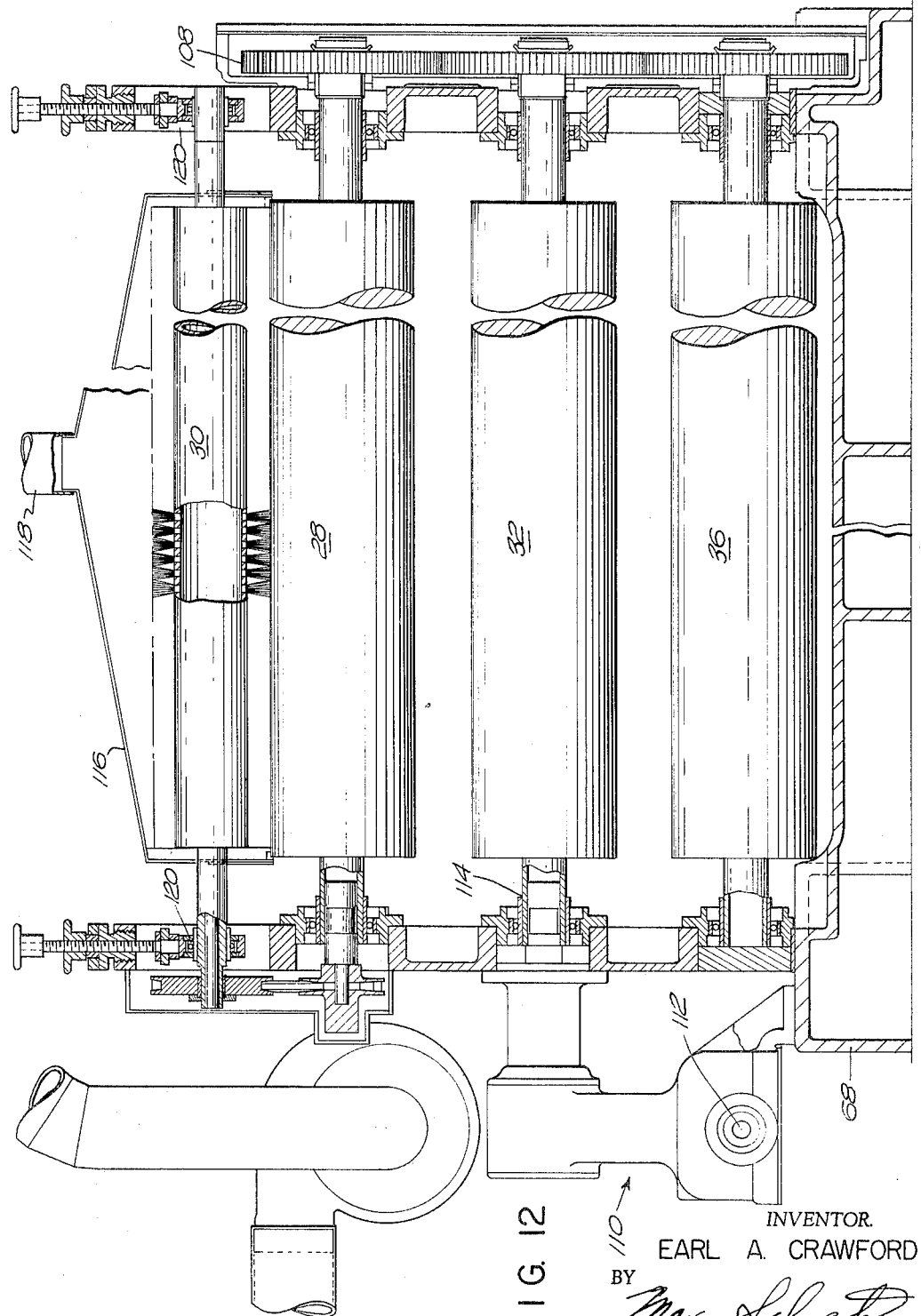

May 24, 1966  E. A. CRAWFORD  3,252,415
ZONED TENSION CONTROL FOR PRINTING PRESS
Filed July 9, 1962  33 Sheets-Sheet 11

INVENTOR.
EARL A. CRAWFORD
BY
Max Schwartz
ATTORNEY

INVENTOR.
EARL A. CRAWFORD
BY
Max Schwartz
ATTORNEY

INVENTOR.
EARL A. CRAWFORD
ATTORNEY

May 24, 1966     E. A. CRAWFORD     3,252,415
ZONED TENSION CONTROL FOR PRINTING PRESS

Filed July 9, 1962     33 Sheets-Sheet 18

INVENTOR.
EARL A. CRAWFORD
BY
Max Schwartz
ATTORNEY

May 24, 1966  E. A. CRAWFORD  3,252,415
ZONED TENSION CONTROL FOR PRINTING PRESS
Filed July 9, 1962  33 Sheets-Sheet 20

INVENTOR.
EARL A. CRAWFORD
BY
ATTORNEY

INVENTOR.
EARL A. CRAWFORD
BY
ATTORNEY

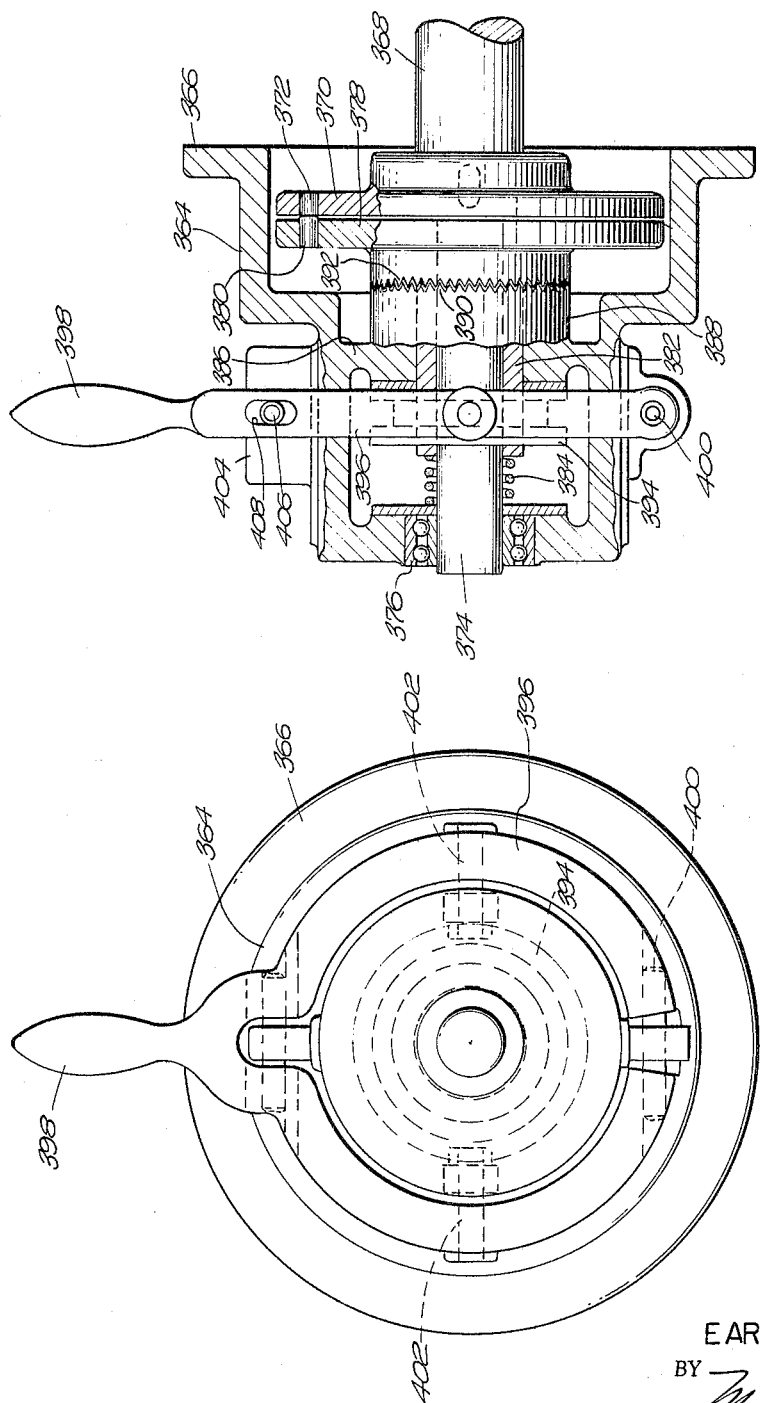

May 24, 1966   E. A. CRAWFORD   3,252,415
ZONED TENSION CONTROL FOR PRINTING PRESS
Filed July 9, 1962   33 Sheets-Sheet 23

INVENTOR.
EARL A. CRAWFORD
BY
*Max Schwartz*
ATTORNEY

May 24, 1966  E. A. CRAWFORD  3,252,415
ZONED TENSION CONTROL FOR PRINTING PRESS
Filed July 9, 1962  33 Sheets-Sheet 24

INVENTOR.
EARL A. CRAWFORD
BY
Max Schwartz
ATTORNEY

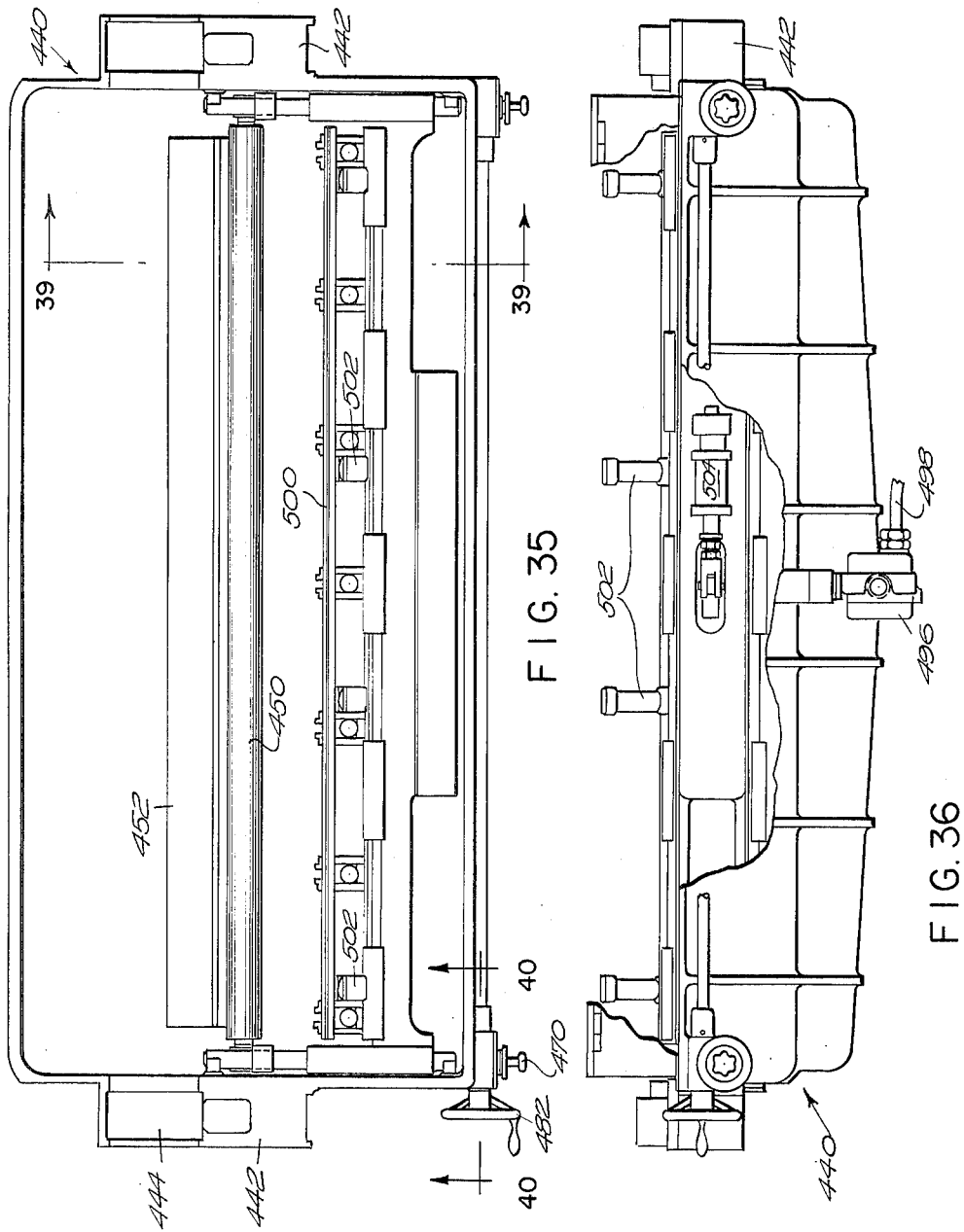

May 24, 1966   E. A. CRAWFORD   3,252,415
ZONED TENSION CONTROL FOR PRINTING PRESS
Filed July 9, 1962   33 Sheets-Sheet 27
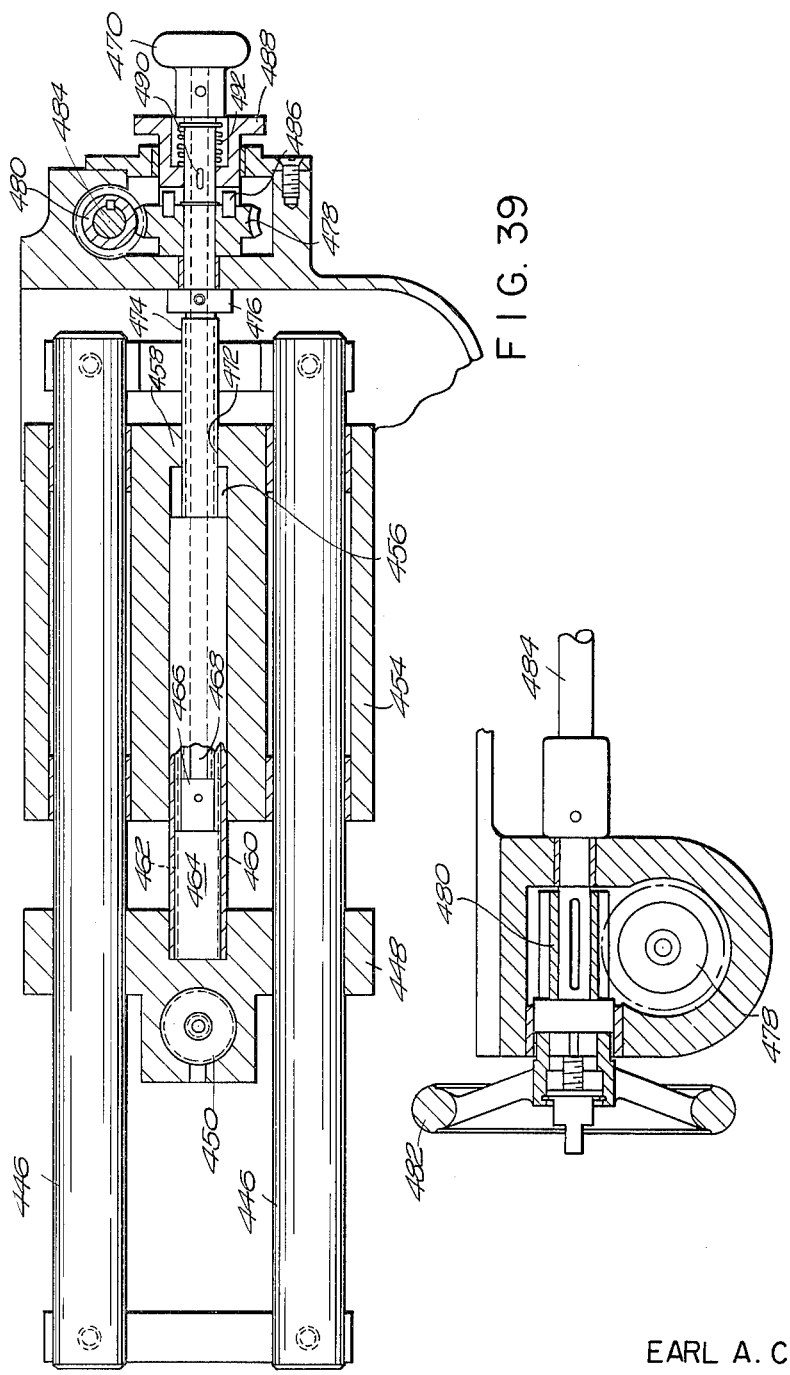
INVENTOR.
EARL A. CRAWFORD
BY
Max Schwartz
ATTORNEY May 24, 1966     E. A. CRAWFORD     3,252,415
ZONED TENSION CONTROL FOR PRINTING PRESS
Filed July 9, 1962     33 Sheets-Sheet 28

INVENTOR.
EARL A. CRAWFORD
BY
ATTORNEY

May 24, 1966  E. A. CRAWFORD  3,252,415
ZONED TENSION CONTROL FOR PRINTING PRESS
Filed July 9, 1962  33 Sheets-Sheet 31

INVENTOR.
EARL A. CRAWFORD
BY
*Max Schwartz*
ATTORNEY

May 24, 1966   E. A. CRAWFORD   3,252,415
ZONED TENSION CONTROL FOR PRINTING PRESS
Filed July 9, 1962   33 Sheets-Sheet 32

INVENTOR.
EARL A. CRAWFORD
BY Max Schwartz
ATTORNEY

May 24, 1966   E. A. CRAWFORD   3,252,415
ZONED TENSION CONTROL FOR PRINTING PRESS
Filed July 9, 1962   33 Sheets-Sheet 33

INVENTOR.
EARL A. CRAWFORD
BY Max Schwartz
ATTORNEY

United States Patent Office

3,252,415
Patented May 24, 1966

3,252,415
ZONED TENSION CONTROL FOR
PRINTING PRESS
Earl A. Crawford, Warwick, R.I., assignor to St. Regis
Paper Company, New York, N.Y., a corporation of
New York
Filed July 9, 1962, Ser. No. 208,460
18 Claims. (Cl. 101—181)

My present invention relates to the printing art, and more particularly to an improved construction in a rotary cylinder type web printing press.

The principal object of the present invention is to provide an improved printing apparatus which is realtively simple and compact in construction and which is capable of printing in a wide range from the lowest cost process such as flexographic printing to the highest quality printing by the offset transfer process.

A further object of the present invention is therefore to provide a press having the ability to be easily and rapidly changed from one type of printing to another. This provides the press with a great deal of flexibility and eliminates the necessity for additional types of printing equipment.

Another object of the present invention is to provide a printing press construction in which the web tension is accurately and selectively controlled in the various zones through which it passes. These zones comprise the draw in zone, the printing zone and the draw out zone. By accurately controlling these zones the quality and register of the printing on extensible materials can be more accurately maintained especially in multicolor work.

A further object of the present invention is to provide a novel type of platen mounting which provides for a fixed position of the platen cylinder. Drive is controlled by a selective operation of the platen from a drive condition to a free wheeling condition. "On" and "off" print impression is controlled by the inking unit and not the platen.

Another object of the present invention is therefore, to provide a press in which the web position and tension is maintained whether the press is "on" or "off" print impression.

Another object of the present invention is the provision of a device for controlling the register of the press after it has been stopped and restarted. The reregister control is a novel device to permit going "on" printing impression at the exact point on the web where the press went "off" impression when it was stopped.

Still another object of the present invention, therefore, is to provide a reregister control device, either manual or electrical, which results in a considerable saving of stock in subsequent converting operations, saves time and helps to maintain the color registers while stopping and starting.

An additional object of the present invention is to provide a press having the above advantages in which the ink cylinder, ink fountain and ink storage reservoir together with the doctor blade and ink pumping assemblies are mounted in a single removable assembly which permits rapid interchange of the components. This permits quick color and web changes and rapid changeover from one type of printing to another, reducing the "down" time of the press.

A further object of the present invention is to provide a novel type of drying unit for a press having all the above advantages. It is essential for high speed operation that the ink be properly dried between the printing units and provision be made for oven drying an undercoat if required. Furthermore, the web must be cooled between the color units. All this is provided for in the novel drying oven of the present invention which is highly flexible and is designed to provide a maximum of drying temperatures at great saving in fuel costs.

The press of the present invention is also provided with many other constructional improvements hereinafter to be described to provide a simple compact and durable high speed press.

With the above and other objects and advantageous features in view, my invention consists of the novel arrangement of parts more fully disclosed in the detailed description following, in conjunction with the accompanying drawings, and more particularly defined in the appended claims.

In the drawings,

FIGS. 6, 7 and 8 are fragmentary views of the inking and printing unit showing the various changes for different types of printing operations.

FIG. 11 is a side elevation taken from the drive side of the draw in unit.

FIG. 12 is a front view of the draw in unit with the idler roller removed and the drive connections in section.

FIG. 31 is a detailed view of the yoke assembly on the manual reregister device.

FIG. 32 is a longitudinal section of the manual reregister device.

FIG. 35 is a top plan view of the ink reservoir.

FIG. 36 is a front elevation of the ink reservoir.

FIG. 39 is a section taken on line 39—39 on FIG. 35.

FIG. 40 is a section taken on line 40—40 on FIG. 35.

Figure 1:
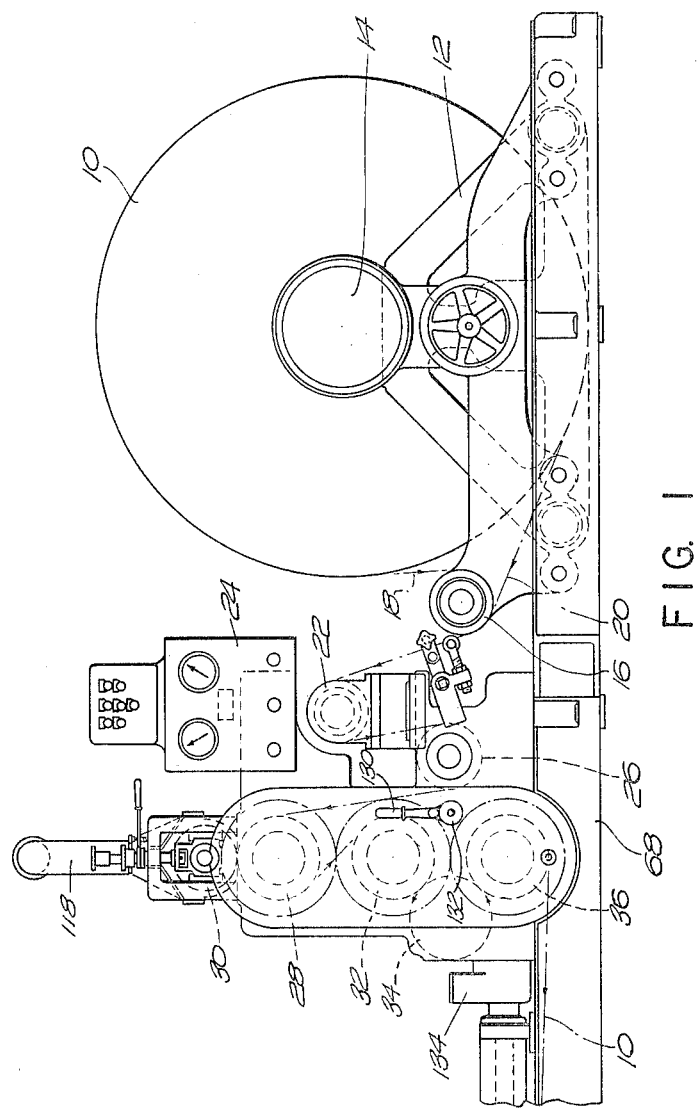
FIG. 1 is a side elevation of the draw in assembly and unwind stand as viewed from the operator's side of the press.

In the modern packaging art there is an increasing demand for high quality printing on a large range of materials. Economically, a printing press for handling these materials must be diversified so that it can be quickly and easily converted for different types of printing operations. It must also be able to operate at high speeds.

The press of the present invention is equipped to deliver printing ranging from the lower cost rubber plate, letterpress printing to the highest quality offset transfer printing. The press of the present invention is designed to operate in a range of from 50 to 1500 feet per minute. At these speeds in multicolor printing maintaining the register is an acute problem. The press of the present invention is therefore equipped with a novel zoned tension control device which permits the selective tensioning of the web in accordance with the material and its characteristics and the maintenance of this tension at any speed throughout all the printing units. To accomplish this the press is equipped with a novel platen construction utilizing a fixed position so that the web is held under constant tension in a fixed position when the press is "off" printing impression.

Because of the rigid tension control of the web not only while the press is running but also when it is stopped and restarted, the press of the present invention is also equipped with a novel reregister control. Since the web is in a fixed tension and position when the press goes "off" impression, it is possible to provide the press with a device which will allow the the press to go "on" printing impression only at the exact point where it went "off" impression.

The combination of the tension control and the reregister control results in a considerable saving of between color web and in time normally required for running the press back in register after each stoppage.

The fixed platen is possible because of the novel construction of the frame and inking arrangement in going "on" and "off" impression. The inking arrangement of the press of the present invention permits a new color or job to be made ready in advance outside the press and quickly interchanged with the one in the press. The press of the present invention can thus rapidly be changed from one color to another, from one job to another and from one type of printing to another.

Finally, to operate at high speeds and register accurately through a plurality of printing units it is necessary that the web be dried and cooled between impressions. Accordingly each printing unit of the present invention is an island complete in itself. It is not only equipped with all the novel features of the present press but is also equipped with its own drying unit and combustion chamber and its own cooling cylinder.

The press of the present invention is therefore designed with a great deal of flexibility in its type of printing. It is designed to operate at high speeds and print with rapid setting fluid inks on any type of material. All this is accomplished with the unique press construction coupled with the novel features of the zoned tension control, the fixed position free wheeling platen cylinder, the reregister device, the interchangeable inking unit and the novel drying and cooling unit.

The press of the present invention is generally illustrated in FIGS. 1 to 8 inclusive. FIG. 1 illustrates the rolled web mounting and its associated unwinding mechanism as viewed from the operator's or control side of the press. The web 10 is mounted on a conventional type of unwind stand 12 in which the shaft is subject to a pneumatic braking action 14 for applying an adjustable unwinding tension to the web. At the forward end the stand 12 is provided with an idler roller 16. The web 10 may be unwound in any desired direction. When the web is unwound counterclockwise, as viewed in FIG. 1, it will come off at 18, follow the arrow and pass beneath the idler roller 16. When the web is unwound clockwise, it will come off at 20, follow the arrow and pass under the same idler roller 16. From that point on the web follows the line indicated by the arrows in FIG. 1. It passes over a sensing roller 22 adjacent the control panel 24 which indicates the tension and permits the adjustments for the proper settings. From the roller 22 is passes beneath another idler roller 26 and over an upper driven roller 28. At this point the web is brushed clean by the brush roller 30. The web now enters the pyramid lock rollers 32, 34 and 36. These rollers are designed to drive the web and to lock the tension so that the unwinding tension is not transmitted beyond this point, as will be more fully hereinafter described.

Figure 2:
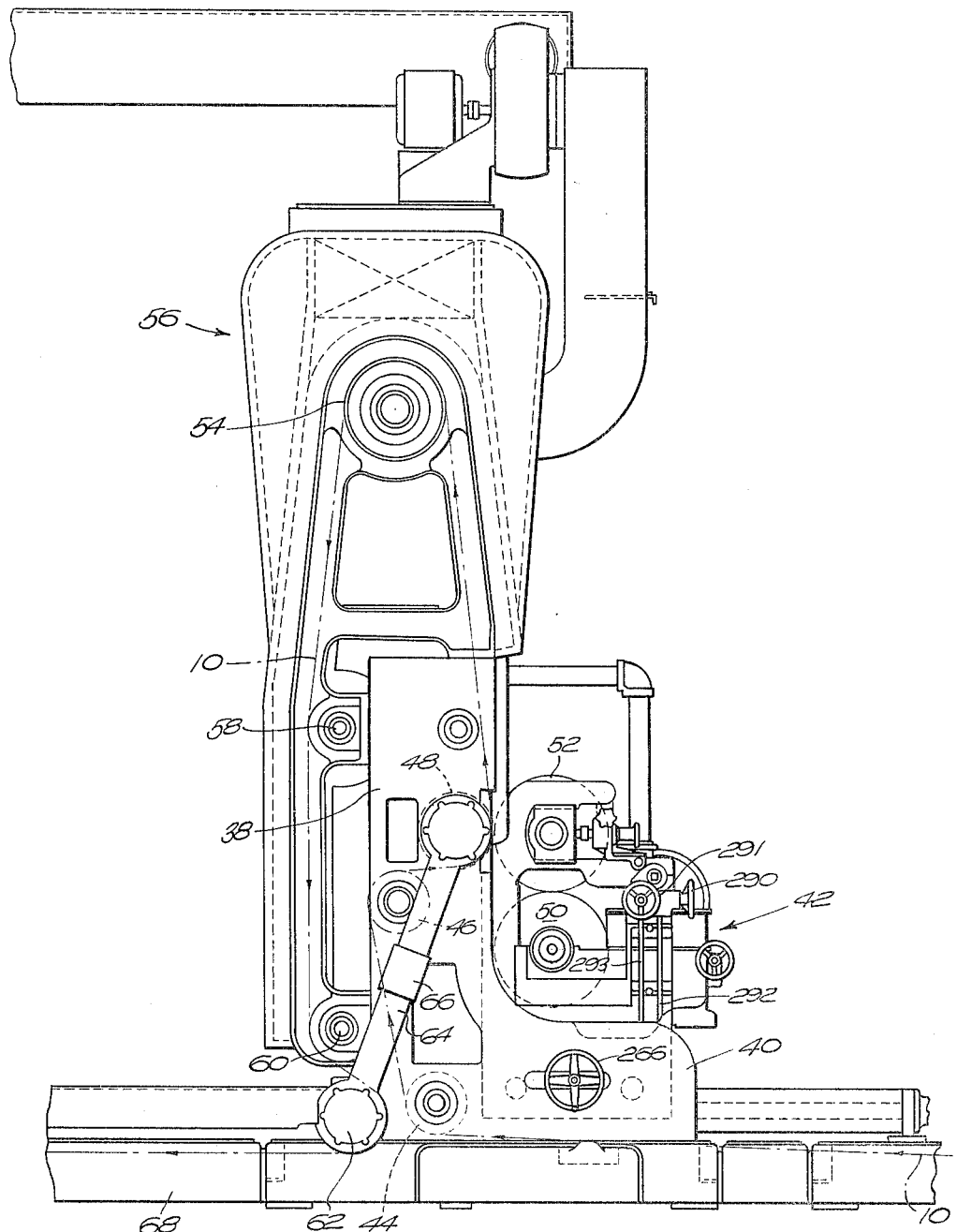
FIG. 2 is a side elevation of one of the printing units as viewed from the operator's side of the press.
Figure 4:
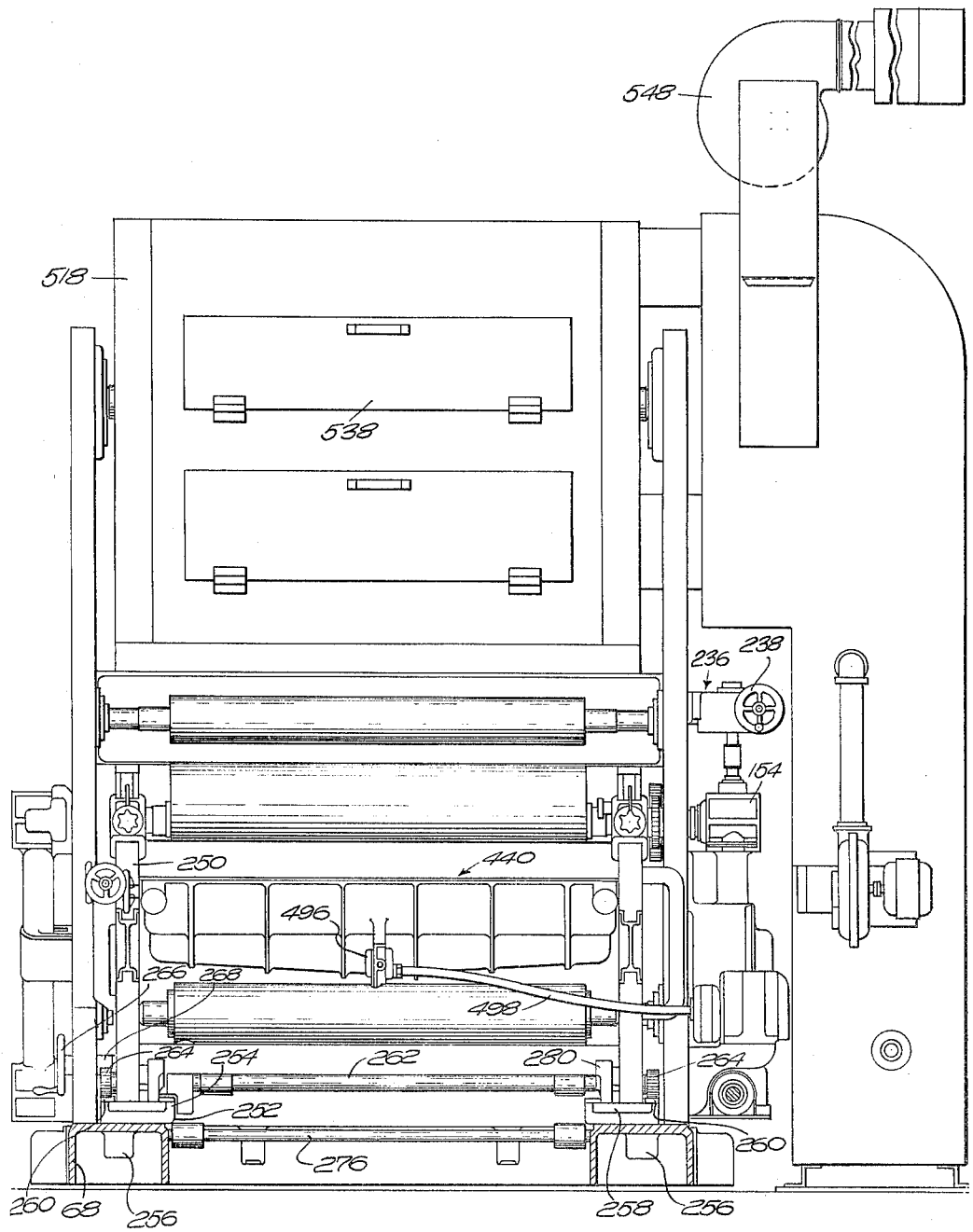
FIG. 4 is a front view of one of the printing units.
Figure 5:
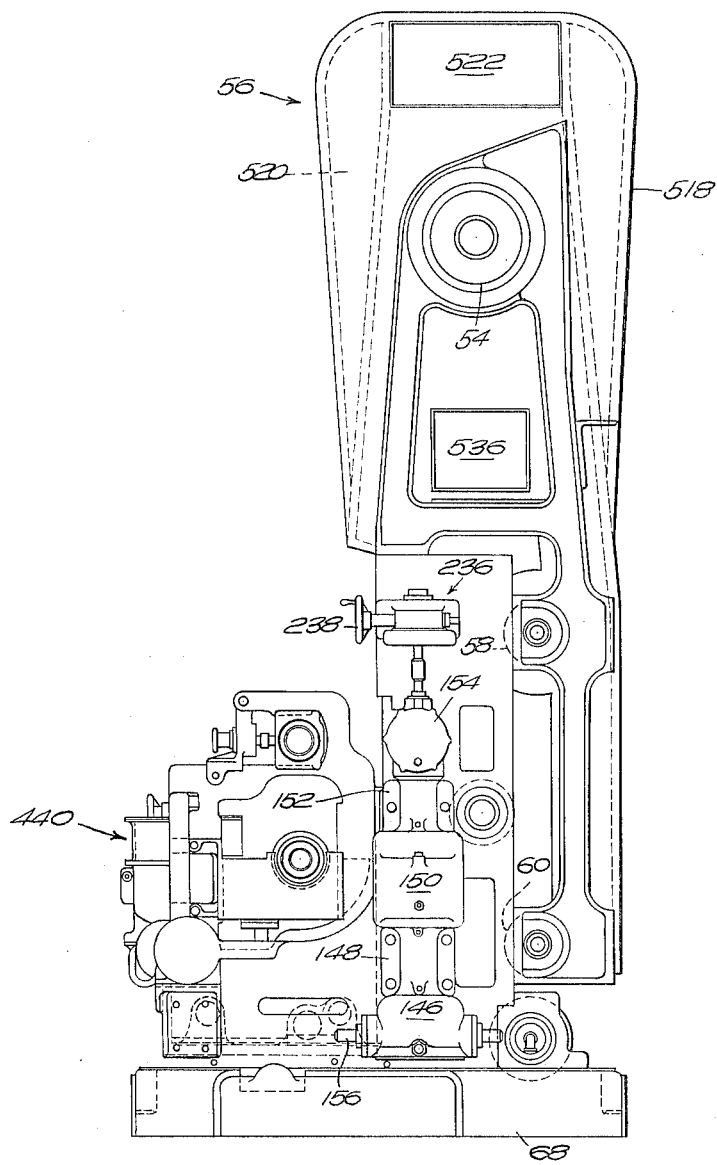
FIG. 5 is a side elevation of one of the printing units viewed from the drive side of the press.

The web 10 now enters the first printing unit also illustrated from the operator's side in FIG. 2. It is contemplated that each printing unit handle a single color and be a complete printing island in and of itself. Therefore the units are separated from each other and platforms are provided so that carts can be inserted for changing printing units and cleaning the press. FIG. 4 illustrates one of the printing units as viewed from the right in FIG. 2 and FIG. 5 is a view of the drive side of the printing unit shown in FIG. 2. Each printing unit comprises a frame 38 having an L-shaped horizontal leg 40 on which the color or inking unit 42, hereinafter to be described, is mounted. The web 10 passes beneath the frame portion 40 and around an idler roller 44 at the lower end of the frame 38. From this point it moves upwardly and slightly rearwardly around another idler roller 46 and then around the platen cylinder 48 which is driven. At the platen cylinder 48 the web is imprinted or coated. The inking unit 42 consists of a pair of cylinders 50 and 52 in vertical alignment and tangentially touching each other. In the form illustrated in FIG. 2 the cylinders 50 and 52 are the same size. These cylinders are designed for offset gravure printing, the lower cylinder 50 contitutes the plate cylinder and the cylinder 52 constitutes the transfer cylinder. The printing is transferred from the plate cylinder 50 to the offset cylinder 52 which in turn transfers it to the web 10 traveling around the platen cylinder 48. The inking and doctor blade assembly will be hereinafter described in more detail.

The web 10 now travels upwardly around a large idler roller 54 in the drying oven 56, back downwardly over idler rollers 58 and 60 and around a driven cooling cylinder 62 at the bottom end. The cylinder 62 is driven from the platen cylinder 48 and is of the identical size thereto to prevent undue strain on the web 10. The drive consists of a split shaft 64 controlled by a magnetic clutch 66. The web 10 leaves the printing unit shown in FIG. 2 beneath the platform or base 68 and travels to the next printing unit which should be identical with the unit shown in FIG. 2 and through any given amount of printing units depending on how many colors are required. Finally, the web 10 reaches the rewind unit shown in FIG. 3.

Figure 3:
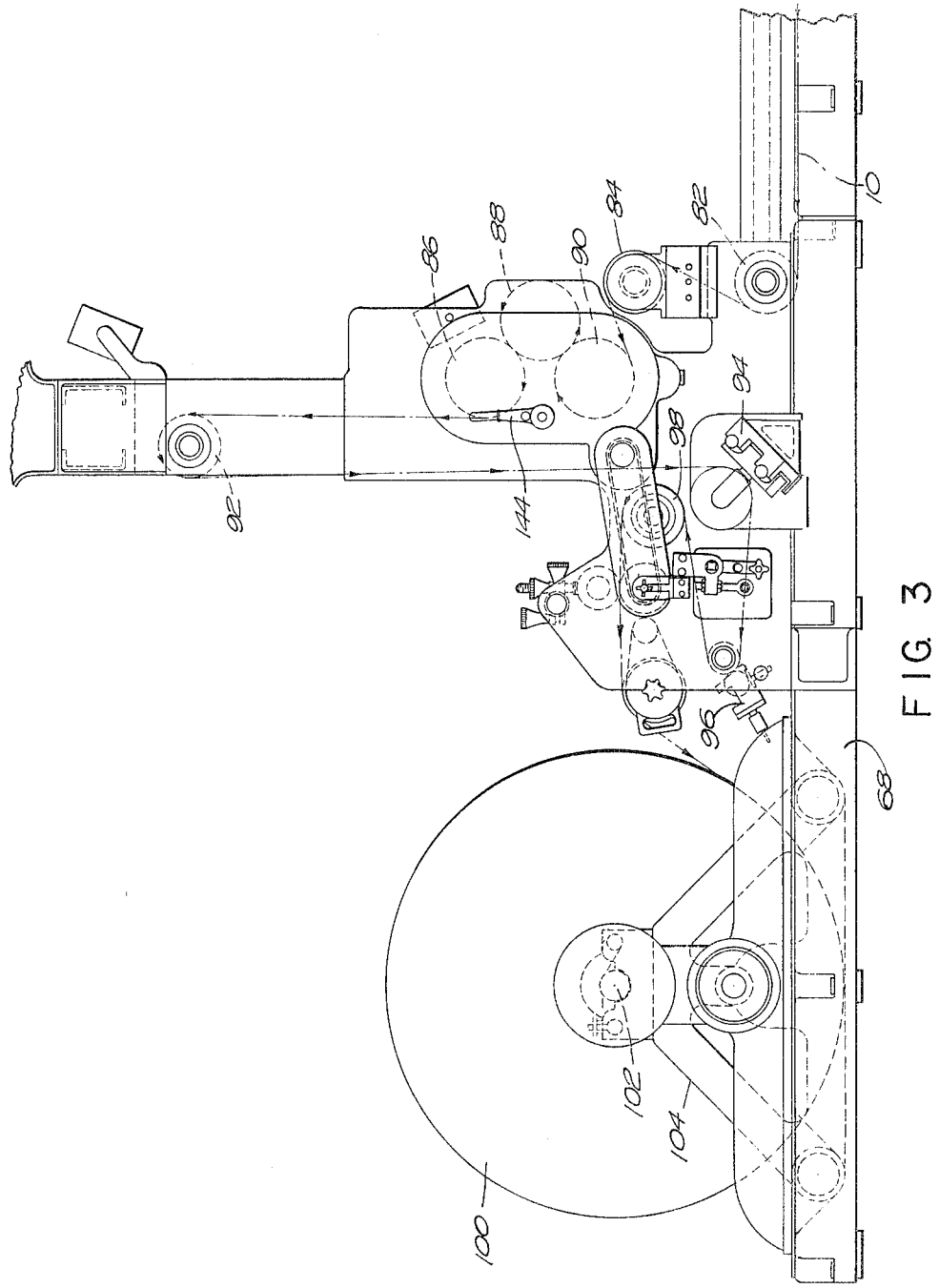
FIG. 3 is a side elevation of the draw out assembly and rewind stand as viewed from the operator's side of the press.

Before proceeding with the general description of the rewind unit shown in FIG. 3, it should be noted that the printing unit shown in FIG. 2 may be modified for either offset gravure or flexographic printing. In flexographic printing, the upper cylinder touching the web 10 is a rubber plate cylinder on which the type has been impressed. The lower cylinder is merely an inking cylinder. In the offset gravure the lower cylinder contains the plate and the upper cylinder is a transfer cylinder. FIG. 6 is a view of the inking assembly 42 shown in FIG. 2 in which the upper cylinder 70 is the largest that can be proportionately fit into the press. The lower cylinder 72 is approximately the same size as the cylinder 50. This is the largest plate or flexograph cylinder that can be put in the press. FIG. 8 illustrates the smallest flexograph cylinder that can be positioned in the press. In this figure the lower cylinder 74 is again approximately the same size as the cylinder 72 in FIG. 6. The upper cylinder 76 is proportionately smaller. FIG. 7 illustrates the largest offset gravure cylinders. In this view the cylinders 78 and 80 are of the same size as required by this form of printing. In the illustrated press it is contemplated that the offset cylinders 50 and 52 have a circumference of 24 inches and that the largest offset cylinders 78 and 80 have a circumference of 48 inches. This is illustrative of the range. Of course in flexographic printing it is not necessary that the cylinders be of the same size and it is therefore possible to have a much larger range from the smallest to the largest plate as shown in FIGS. 6 and 8.

Now referring to the draw out unit shown in FIG. 3, the web 10 passes beneath an idler roller 82 and over a sensing roller 84 similar to the roller 22 in FIG. 1. The draw out unit is also provided with a control panel similar to 24 in FIG. 1 (not shown). From here the web enters the pyramid locking arrangement formed by rollers 86, 88 and 90. The web is then passed over another idler roller 92 and through the slitters 94 and 96 where it can be slit as required. The web then passes over another idler roller 98 and is wound at 100 on a core 102 mounted on a conventional winding frame 104. The winding is accomplished by a conventional tension winding mechanism (not shown) which can be adjusted for constant tension winding as desired.

*Zoned tension control*

The press of the present invention is equipped with a novel tension control mechanism which automatically controls the web tension in three independent tension zones: The roll unwind tension control, the printing web tension control, and the roll rewind tension control. The web tension in each zone can be adjusted to operate under the most favorable conditions without interfering with the other operating zones. In the present application this system is shown as applied to a printing press. However, the same type of mechanism can be used in other applications, whether the web is made of paper, metal or any other material.

FIG. 1 illustrates the web roll 10 mounted on its unwind stand 12. It is contemplated that the unwind stand be equipped with certain conventional devices, not shown. For example, unwind stands are usually equipped with automatic centering devices activated through a web sensing edge guide to keep the web accurately centered. Such devices are conventional. Tension on the web 10 is controlled by a water cooled, air operated brake coupled to the parent roll unwind shaft. This brake is of the type manufactured by the Wichita Clutch Co. of Wichita Falls, Texas, and known as a Wichita Water Cooled Air Brake model No. ATD-11 or ATD-106. Other manufacturers, such as Westinghouse Air Brake, make this type of brake. This brake is automatically controlled through a pneumatic pressure sensing roll 22 over which the web passes as illustrated in FIG. 1. The selected web tension and control is regulated at the control panel 24. When the press stops, the unwind roll brake maintains a web holding tension on the web. The pressure sensing and brake control devices are of the type manufactured by the Pneumatic Applications Co. of Simsbury, Conn., type P/A Automatic Tension Controller 3C-XP-7A with a Transmitter Span A-600. Similar equipment is also manufactured by the Mount Hope Machinery Co. of Taunton, Mass.

Figures 9, 10:
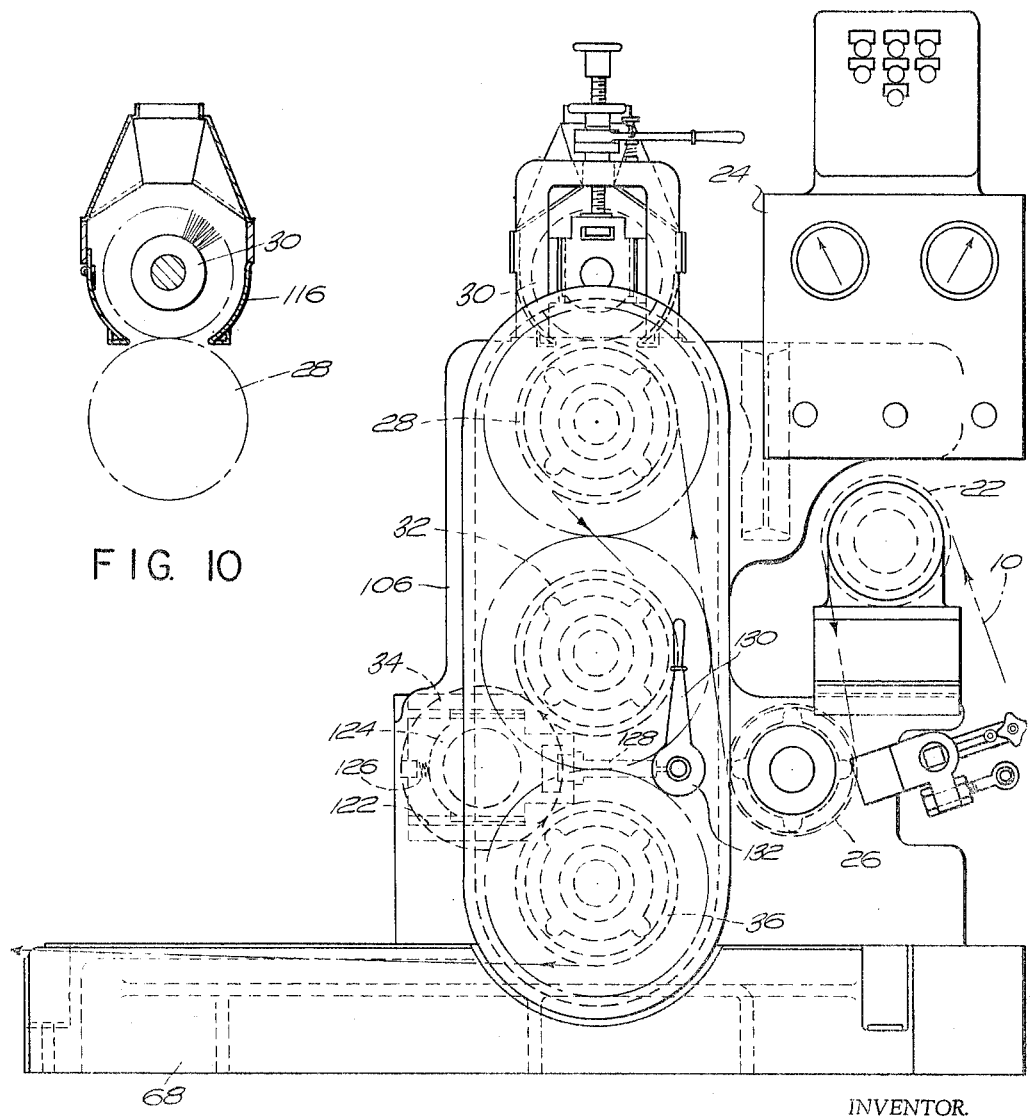
FIG. 9 is an enlarged side elevation of the operator's side of the draw in unit.
FIG. 10 is a transverse section through the cleaning brushes and vacuum cleaner on the draw in unit.
Figure 13:
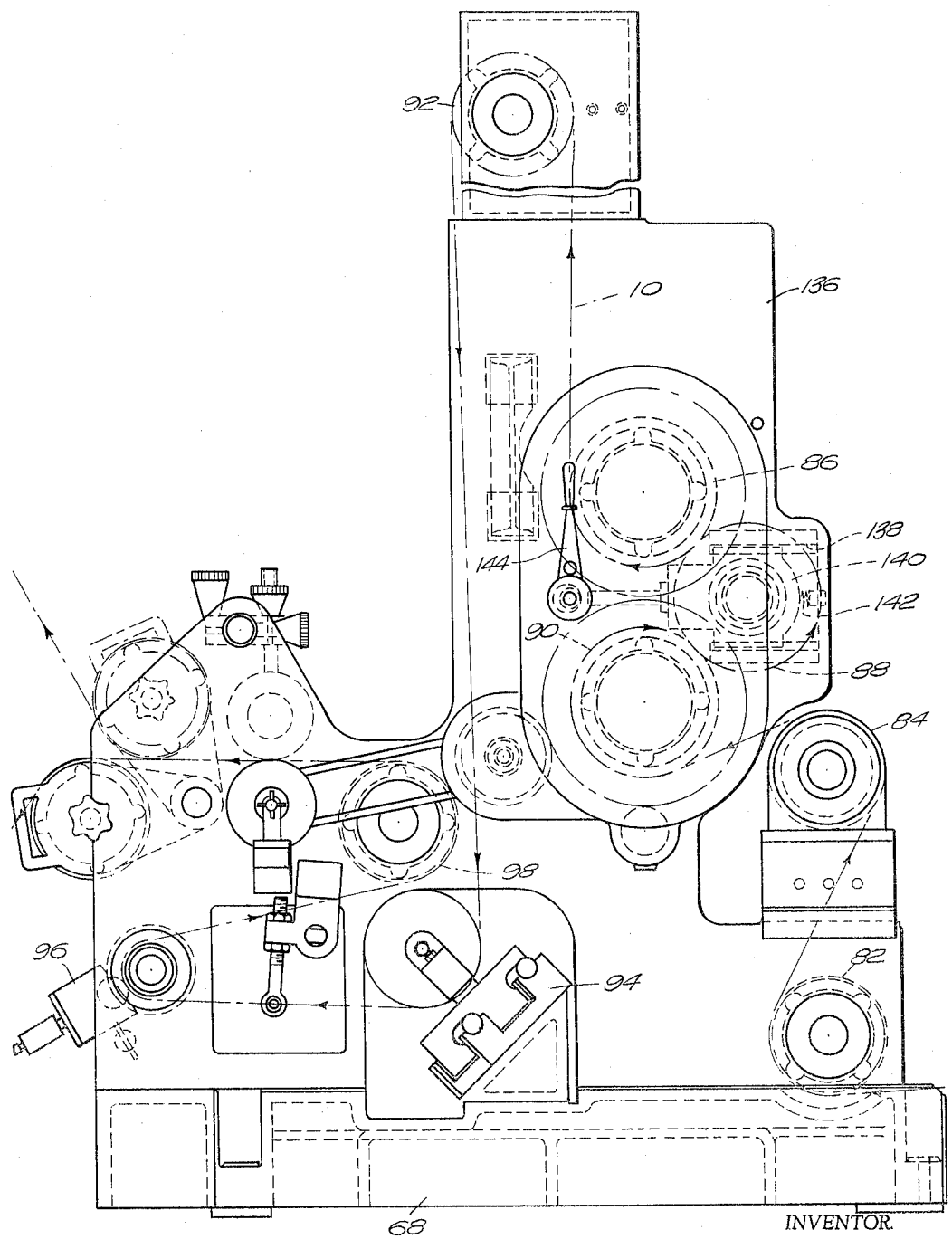
FIG. 13 is a side elevation taken from the operator's side of the draw out unit.

The feed roll mechanism adjacent the unwind stand is shown in more detail in FIGS. 9 to 12 inclusive. The draw in rolls are vertically mounted in a frame 106 as can be seen in FIG. 9, the rolls 28, 32 and 36 are of equal diameter and their shafts are connected along one side by the train of gears 108 so that all three rolls are positively driven at the same r.p.m. Referring to FIG. 12, note that the drive assembly 110 is connected to the main drive shaft 112 and drives the roller 32 at 14. The impulse is then distributed through the gear train 108 to the rollers 28 and 36. The web 10 passes from beneath the idler roller 26 over the driven roller 28 executing a 180° wrap around the roller 28 as illustrated in FIGS. 1, 9 and 11. Mounted above the roller 28 is the brush roller 30 which is preferably a right and left hand spirally wound brush which rotates against the travel of the web to remove dust and wrinkles from the material. A hood 116 surrounds the brush 30 and is connected through the pipe 118 to a vacuum exhauster which collects the dust in a dust bag as it is brushed from the web. The brush roller is mounted in adjustable bearings 120 to compensate for wear.

The tension locking device comprises the pyramid assembly formed by the rolls 32, 34 and 36 as illustrated in FIGS. 1, 9 and 11. Preferably the rolls 32 and 36 are aluminum anodized at their surfaces and the idler roller 34 is a rubber surface steel cylinder. The roller 34 forms a free rotating, self adjusting wedge between the roller 32 and 36. Referring to FIGS. 9 and 11, the frame 106 is provided with spaced parallel track members 122. The bearings 124 on the idler roller shaft are horizontal slidably mounted in the track members 122 at each end. At one side the frame is provided with a spring 126 which tends to push the bearings 124 for the roller 34 yieldingly towards the rollers 32 and 36. The bearings 124 are also provided with a shaft 128 which extends horizontally between the rollers 32 and 36 against a lever 130 which operates the cam 132 bearing against the free end of the shaft 128. As the web 10 passes over the upper roller 28 as shown in FIGS. 1, 9 and 11, around the roller 32, around the idler roller 34, and back and around the lower roller 36, it is obvious that tension and pull on the web will draw the idler roller 34 inwardly towards the rollers 32 and 36 assisted by the action of the spring 126. This arrangement wedges the web in the pyramid arrangement formed by the rollers 32, 34 and 36, and the drive of the rollers 32 and 34 draws the web 10 from the unwind stand. The lever 130 and cam 132 are used in loosening the web 10 and for threading the web through the press. Movement of the lever 130 clockwise in FIG. 9 will cause the cam 132 to push the shaft 128 rearwardly against the action of the spring 126 and thus move the roller 34 away from the rollers 32 and 36 a slight distance sufficient to pass the web around the rollers.

With the above arrangement it will be found that web tension exerted by the breaking action on the unwinding shaft 14 is transmitted through the web only as far as the pyramid rolls 32, 34 and 36. In view of the locking wedge action between these rollers, the tension on the web between the unwind stand 12 and the pyramid rollers is confined to the area illustrated in FIG. 1 and does not pass beyond it. By the same token any tension between the pyramid rollers 32, 34 and 36 and a similar set of pyramid rollers at the rewind end is not transmitted to the unwind zone. The pyramid arrangement thus serves to draw the web into the press or other mechanism but also serves to lock the tension on both sides thereof. The rolls 32 and 36 are connected to the press drive shaft. When the web stops, a combination brake and clutch 134 (FIG. 1) disconnects from the main drive 112 and the brake engages to lock the web securely in the pyramid feed rolls to prevent the web from creeping ahead while a web splice is being made on the unwinder.

The web tension control as illustrated in the present invention is directed to a printing press. However, as hereinabove stated, the device can readily be applied to any other type of operation. The central zone of tension passes through the press or any other machine, the tension being controlled between the pyramid draw-in rolls hereinabove described and shown in FIG. 1, and the draw out or rewind end illustrated in FIG. 3. The details of the rewind tensioning device are shown in FIGS. 13 to 18 inclusive.

The pyramid arrangement of the rollers 86, 88 and 90 is identical to that of the draw-in rolls 32, 34 and 36. The rolls 86 and 90 are mounted in spaced vertical position in the frame 136. Spaced parallel horizontal tracks 138 are provided in which the bearing 140 for the roller 88 is horizontally slidable. The spring arrangement 142 urges the roller 88 towards the rollers 86 and 90 and the cam lever 14 is used to separate the rollers when the web is being threaded through the press. The roller 88, which is an idler rollers, is identical in size and diameter to the roller 34 and is also rubber covered. The rollers 86 and 90 correspond to the rollers 32 and 36. However these rollers 86 and 90 are oversize so that they provide an increase in surface speed when driven at the same r.p.m. as the rollers 32 and 36. This produces a tension on the web 10 between the two sets of pyramid rollers. The rollers 86 and 90 are joined by gears so that they drive together.

Figure 14:
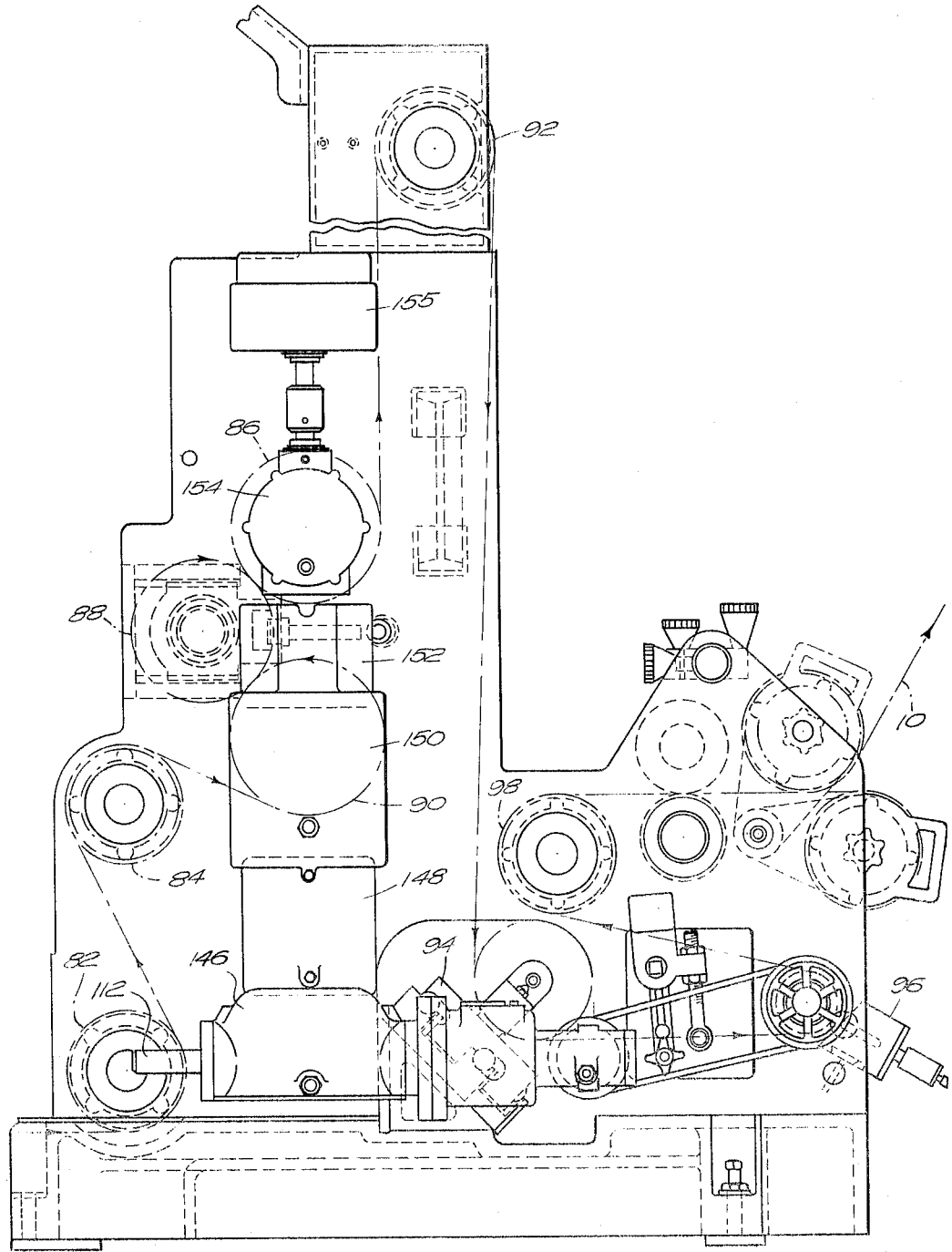
FIG. 14 is a side elevation taken from the drive side of the draw out unit.
Figure 15:
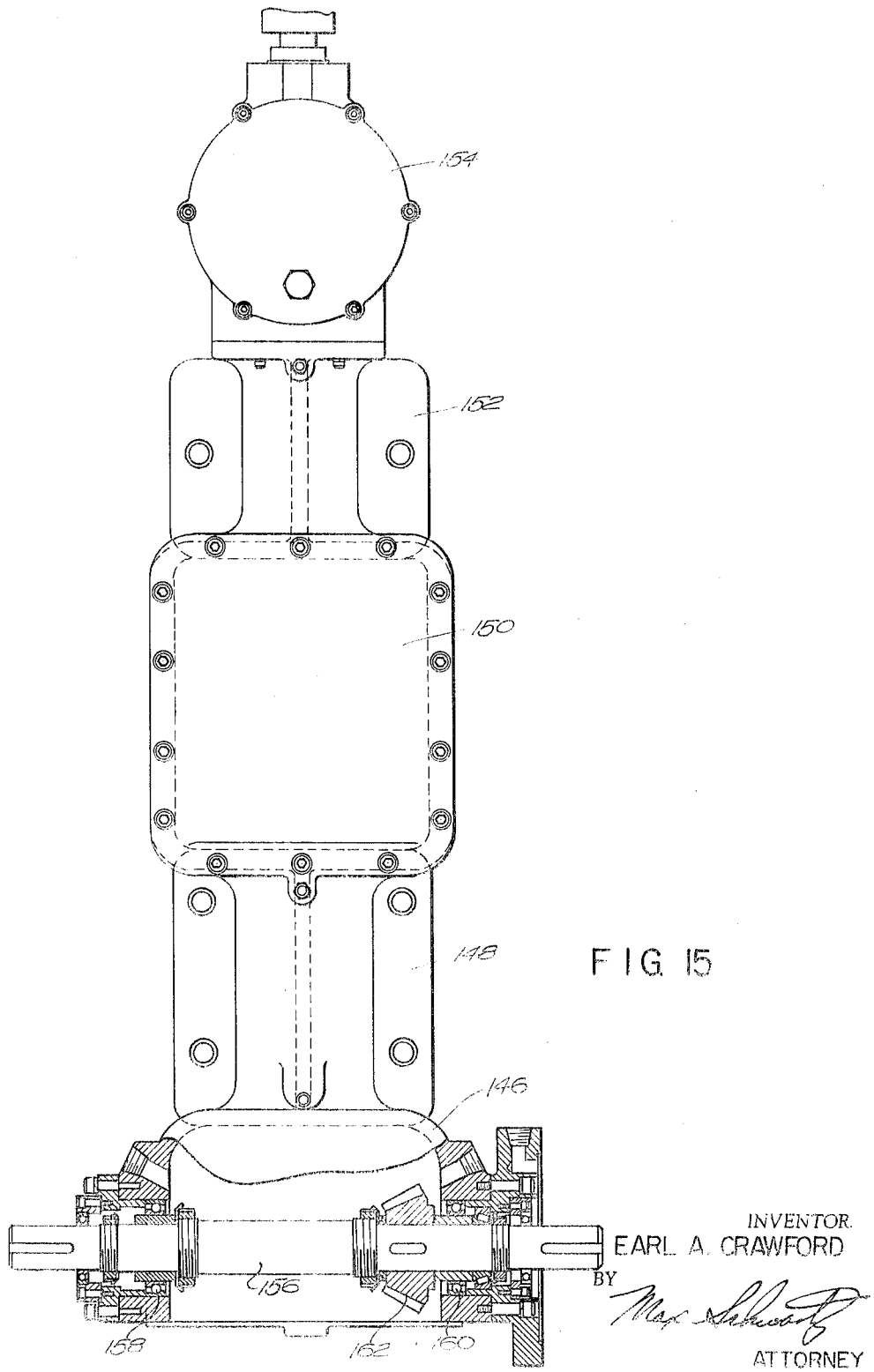
FIG. 15 is a side elevation showing the differential drive assembly for the draw out unit and the press with the drive connection in section.

The drive is through the upper roller 86. FIG. 14 illustrates the drive side of the arrangement and shows the drive 146 from the main drive shaft 112 extending vertically through a housing 148, another housing 150, still another housing vertically stacked 152 and the entire arrangement surmounted by a housing 154. FIG. 15 illustrates the details of the various housings including the connection to the main drive shaft at the lower end 146. A horizontal shaft 156 is keyed to the main drive shaft and is mounted in the lower housing 146 with bearings 158 and 160. A bevel gear 162 is mounted on and keyed to the shaft 156 within the housing 146 and designed to transmit the power vertically. Now referring to FIG. 16, the gear 162 meshes with and drives a horizontal gear 164 which is keyed to the bottom end of a vertical shaft 166 extending vertically through the housing portion 148. The shaft 166 is supported at each end of the housing 148 by bearings 168 and 170.

Figure 18:
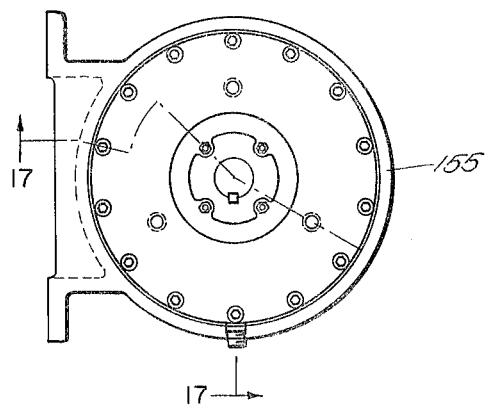
FIG. 18 is a top plan view of the control box shown in FIG. 17.
Figure 17:
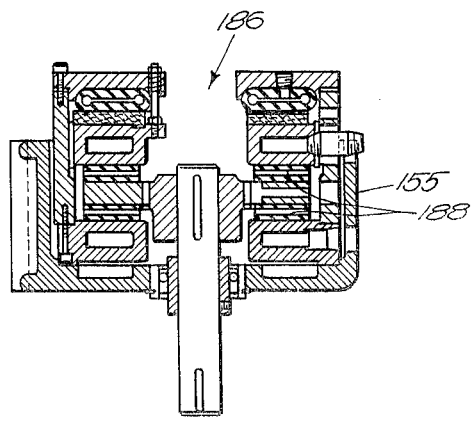
FIG. 17 is a vertical section of the control box for the differential draw out drive.

Mounted in the next vertical housing 150 is the differential arrangement for driving the roller 86. Keyed to the top of the shaft 166 in the housing 150 is a bevel gear 172. The top of the shaft 166 also supports the bottom end of a narrow vertical shaft 174 in a bearing 176 which permits independent rotation of the two shafts. A spider 178 is mounted on the shaft 174 and is provided with a pair of vertical bevel gears 180 and 182 meshing with the gear 172 at the end of the shaft 166. Thus the drive is transmitted upwardly through the shaft 166, gear 172 to the gears 180 and 182 on the spider 178. The narrow shaft 174 extends vertically through a hollow shaft 184 and into the housing 155 which houses a conventional pneumatic brake. Referring to FIGS. 17 and 18, the housing 155 forms an annular control box for the brake mechanism 186. The brake shoes 188 frictionally engage the upper end of the shaft 174 to control of the differential in response to the sensing roller 84.

The bottom end of the hollow shaft 184 is provided with a bevel gear 190 meshing with the spider gears 180 and 182. The shaft 184 is supported through the housing portion 152 by bearings 192 and 194. As it leaves the housing 152 vertically, the hollow shaft 184 is provided with a bevel gear 196 meshing with another bevel gear 198 mounted on a horizontal shaft 200 which is the drive shaft for the upper roller 86.

Power is thus transmitted from the main drive shaft 112 through the shaft 156 to the vertical shaft 166 through the gears 172 and spider gears 182 to the gear 190, hollow shaft 184, shaft 200 and roller 86. However this presupposes that the spider 178 is fixed and locked against rotation. The pneumatic brake in the housing 155 controls the rotation of the shaft 174 and the spider 178 mounted thereon. If the brake were completely set so that the spider 178 were fixed, then the rollers 86 and 90, which are oversized, will gradually increase the tension on the web 10. The sensing roller 84 therefore regulates the penumatic pressure on the brake 186 in the housing 154 so that when the tension on the web exceeds the desired setting, the brake releases and allows the shaft 174 and spider 178 to rotate, thus reducing the speed of rotation of the rollers 86 and 90. The sensing roller 84 and its associated equipment is identical to the sensing roller 22 and its equipment manufactured by the Pneumatic Applications Co. as hereinabove described.

In actual practice when operating, the brake in the housing 155 is never set and the spider 178 is constantly rotating slower or faster in a hunting action to maintain the set tension on the web 10. When the press is slowed down to a stall, the tension of the web passing through the press is always maintained at the desired setting by the differential hereinabove described. The brake 186 in the housing 154 is loosened so that just enough power is transmitted to the rollers 86 and 90 to maintain the preset tension without actual rotation of the rollers or movement of the web 10.

Beyond the pyramid rollers 86, 88 and 90, the web 10 passes through the cutters 94 and 96 as hereinabove described, and is then rewound at 100 on the shaft 102. Rewinding is not done from the main power, but is on its own power by any conventional rewind device which will provide a constant or tapered tension on the web during the wind. One suggested type uses an eddy-current magnetic clutch drive and is manufactured by the Louis-Allis Co. of Milwaukee, Wis. General Electric, Westinghouse Electric, and others also make this equipment. The independent rewind device thus sets up a tension between the pyramid control rollers 86, 88 and 90 and the rewind shaft 102. This is the third zone. With the above described construction, it is thus possible to set up a separate tension in the unwinding zone between the unwind stand and the first set of pyramid rollers 32, 34 and 36; a second tension on the web between the two sets of pyramid rollers 32, 34 and 36 and 86, 88 and 90; and a third tension on the web between the rolls 86, 88 and 90 and the rewind shaft 102. For example in the illustrated press it may be found desirable that the tension on the web leaving the unwind roll illustrated in FIG. 1 be set at five pounds. This means five pounds to each inch of width on the web. This tension is controlled by the sensing roller 22 which controls the brakes on the unwind stand shaft at 14 so that the lock pyramid rollers 32, 34 and 36, which are power driven from the main line, pull the web 10 against the action of the brake at a tension of the desired five pounds. It should be noted that this tension is not transmitted beyond the pyramid rollers.

Tension in the press itself may be set at two pounds. This is controlled by the mechanism hereinabove described, the sensing roller 84 being set to maintain the two pound pressure. This tension is therefore maintained between the pyramid rollers 32, 34 and 36 and the pyramide rollers 86, 88 and 90 throughout the press. Now it may be found desirable that the rewind be at a tension of five pounds again. Thus the rewind device may be set to wind the web at a tension of five pounds between the rolls 86, 88 and 90 and the rewind shaft 102. This tension is not transmitted rearwardly through the pyramid rolls which serve to drive the web but lock the tension. Thus the tension on the web will vary from one end to the other through the various zones, the optimum desirable tension being provided for each type of operation required within each zone.

A complete zoned tension control is thus provided by the use of the pyramid roller construction and differential drive. This is essential when handling materials such as plastics which have a great degree of elasticity. To maintain the proper color register in a multicolor multistation type press it is essential that the tension be the same through every portion of the press and that the tension be not so great that it stretches the web passing through it. The tension control device hereinabove described permits the handling of different types of material under its own proper selected tension as it passes through the press. The zoned tension control also permits closer control of the color register because the printing zone is isolated from the unwind and rewind roll tension action. In fact without proper tension and tension control through the various color segments of the press, proper color register would be impossible on many materials.

*Fixed position free wheeling platen cylinder*

In order to operate at the indicated speeds the press of the present invention uses a fluid, rapid setting ink on both flexographic printing and offset gravure printing. These inks are highly volatile and dry rapidly. This means that the inking system must continue to run when the press is stopped to prevent caking or drying of the ink on the printing cylinders. Therefore, the press must go "off" printing impression when it is stopped and all rolls must separate.

In most gravure presses the platen is merely a rubber backing cylinder which is backed off the gravure cylinder when going "off" impression. This loosens or retracts the web at each printing station and throws it off register. In flexographic printing the type cylinder in most presses is separated from the other cylinders but not rotated. This allows the type cylinder to become gummed up with the ink left on it.

The press of the present invention is therefore designed to go "off" impression each time the press is stopped and the inking system continues to rotate. Furthermore, the press of the present invention utilizes a novel platen construction which enables the selected tension on the web to be maintained whether the press is running or stopped. The platen cylinder construction of the present invention ensures that there is no web motion when the press is stopped, no ink drying on the cylinders, and the register is maintained so that a reregister device can be attached to the press.

Figure 21:
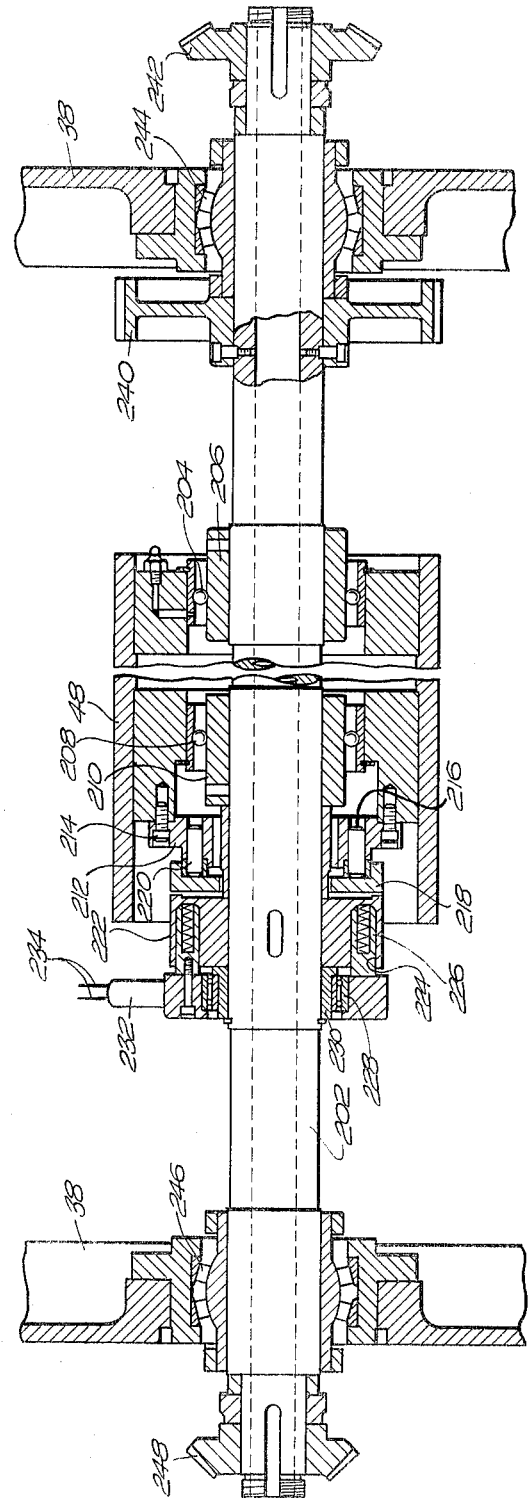
FIG. 21 is a longitudinal section of the platen cylinder.

The novel construction of the platen cylinder is illustrated in FIG. 21. To begin with the platen cylinder in each color segment is in a fixed position. Since the platen is in a fixed position other means must be provided for disconnecting the web from the drive mechanism which is in motion when the press is "off" impression. This is done by providing the platen cylinder with a free wheeling effect. In other words the platen cylinder can be disconnected from its drive shaft so that the shaft can rotate without rotation of the cylinder.

As can be seen in FIG. 2, the platen cylinder 48 is mounted in the frame 38 on the driven shaft 202 (FIG. 21). The cylinder 48 is preferably made of aluminum and dynamically balanced. At the right end, viewing FIG. 21, it is provided with bearings 204 which ride on the complementary bearing portion 206 on the shaft 202. Spaced from the left end is a similar type of bearing insert 208 riding on a complementary bearing portion 210 on the shaft 202. I now provide a magnetic clutch for selectively locking the cylinder 48 rotatably to the shaft 202. This comprises a plate 212 which forms a base which is bolted at 214 to the bearing block 208. The base 214 is provided with a plurality of openings 216. A plate 218 loosely surrounds the shaft 202 and is provided with rearwardly extending pins 220 which enter the openings 216, so that the plate 218 has a sliding movement longitudinally along the shaft 202. Mounted ahead of the plate 218 and keyed to the shaft 202 is a block 222 having an annular slot 224 extending inwardly from the rear, adjacent the outer edge. I now provide an annular magnetic member 226 having the magnetic portions entering the slot 224. The magnetic member 226 rides on bearings 228 on the bearing portion 230 on the shaft 202. The rigid tube 232 connects the magnet 226 to the frame and also carries the electrical connection 234. The opposing faces of the plate 218 and block 222 are provided with interlocking teeth.

Reviewing the construction, the magnet portion 226 is held in fixed position by the rigid tube 232, but the shaft 202 rotates within it through the bearings 228. The block 222 rotates with the shaft, but while it is rotating the magnet impulse is transmitted through it by the member 226. The plate 218 is mounted in the base 212 so that it is rotatable with the cylinder 48. With the parts assembled as illustrated in FIG. 21, the shaft 202 will rotate freely while the cylinder 48 is standing still. There is no direct connection between the shaft and the cylinder which rides freely on the bearings 204 and 208. Now, when the press is driving, the power is applied to the magnet 226 and the magnetic power is transmitted through the block 222 to the plate 218 which is immediately pulled over and locked to it by the intermeshing teeth. Rotation of the plate 218 is transmitted through the base 212 and block 208 to the cylinder 48 so that when the magnet is on and the plate 218 is magnetically held to the block 222, then the cylinder 48 is magnetically locked to the shaft 202 and is driven by it.

Figure 20:
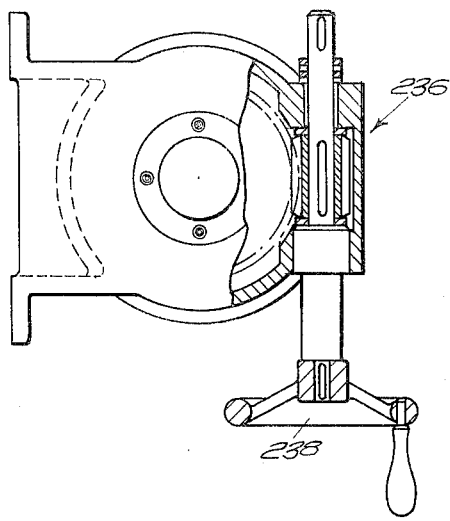
FIG. 20 is a top plan view of the control box shown in FIG. 19.
Figure 19:
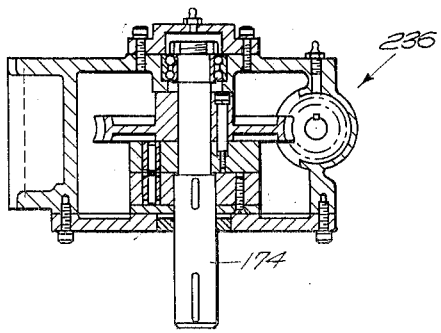
FIG. 19 is a vertical section of the control box for the differential printing unit drive.

The relationship of the platen cylinder 48, the shaft 202, and the rest of the press is more particularly brought out by an examination of FIGS. 2, 4, 5, 15 and 16. It is contemplated that each printing unit be driven from the main shaft of the differential drive illustrated in FIGS. 15 and 16. This drive is used on the draw out unit for tension control when it is provided with the control brake illustrated in FIGS. 17 and 18. However, when the unit is used to drive the printing unit then it is surmounted by the control assembly illustrated in FIGS. 19 and 20. This comprises a worm assembly 236 having a manually operable wheel 238. The worm unit is a self-locking unit which retains its position. The worm gear is connected to the top of the shaft 174. This manually operable wheel 238 is used for changing the register for correction at each printing unit. When the wheel 238 is operated the shaft 174 and spider 178 will be turned. This is transmitted through the gear 240 to the printing unit. However, in order to effect this change it is necessary to first press a button and put the cylinder 48 into free wheeling. This permits the shaft 202 to be turned to transmit the turning movement of the type cylinders without disturbing the web.

Now viewing FIG. 2, the reason for the split shaft connection between the platen cylinder 48 and the cooling cylinder 62 is evident. When the press is "off" impression the platen cylinder 48 is disconnected from the shaft 202 so that the web can come to a complete stop. However the shaft 202 is still rotating to keep the ink in a plastic condition. Since the drive is through the shaft 202, the cooling cylinder 62 would also rotate and tear or otherwise damage the web. Therefore a clutch 66 is interposed between the cylinder 48 and cylinder 62 so that when the cylinder 48 is put into free wheeling and the press is "off" printing impression the clutch 66 disconnects the shaft 64 segments so that the cylinder 62 also comes to a complete standstill.

Figure 16:
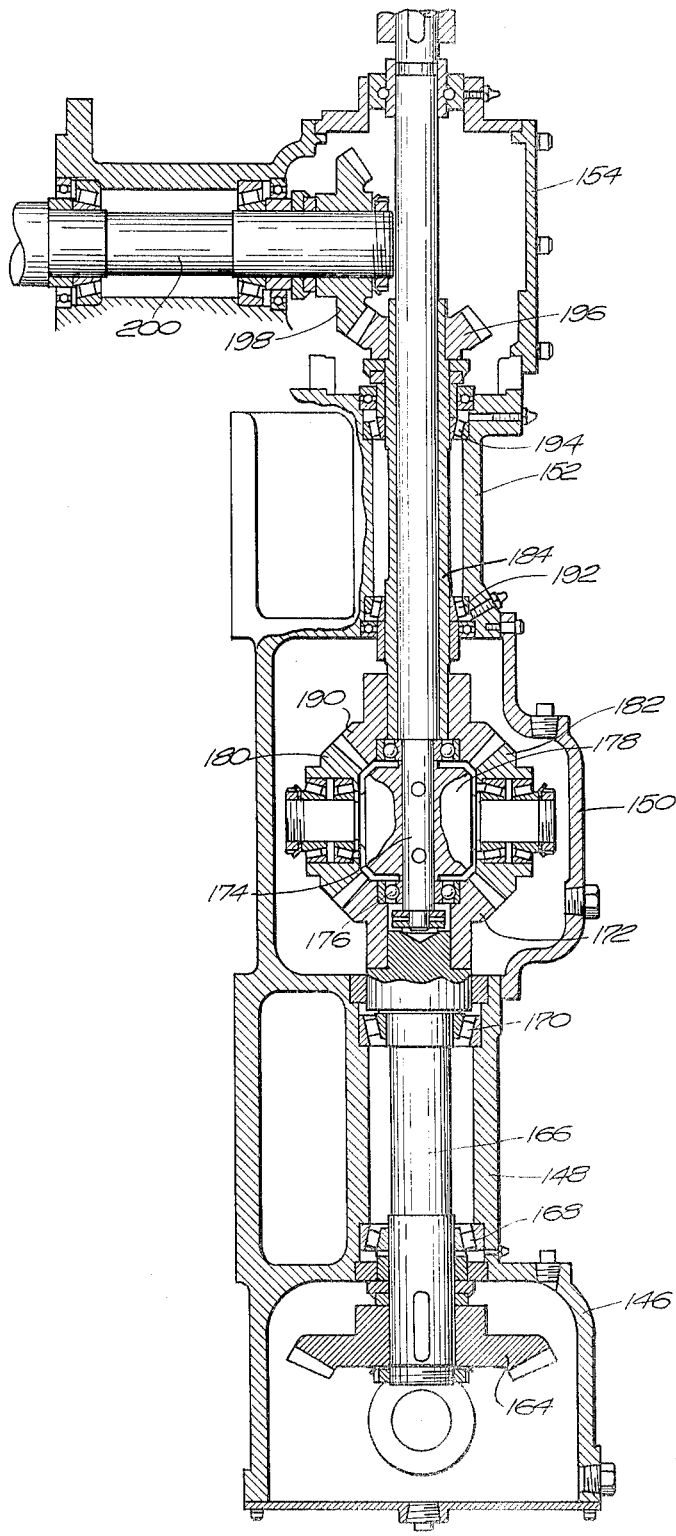
FIG. 16 is a vertical section of the differential drive for the draw out unit and the press.

Now viewing the right side of FIG. 21, the shaft 202 is provided with gears 242 which correspond with the drive gears illustrated in FIG. 16 for driving the shaft 200. In other words the vertical drive portion drives the gears 242 through the differential illustrated therein and comprises the drive for the printing unit. The shaft 202 is retained in barralled bearings 244 in the frame 38. Just inside of the frame is a large gear 240 mounted on shaft 202 which has the same diameter as the platen cylinder 48. This is the driving gear for the printing unit. Its relationship with the printing unit and its position in the frame can readily be seen in FIG. 4. When the press is "off" printing impression, and it is necessary for the printing unit to be rotated, the platen 48 over which the web travels is placed in free wheeling position disconnected from the shaft 202. The shaft 202 thus can continue to rotate and drive through the gear 240 the printing and inking arrangement without disturbing the web. At the opposite end, the shaft 202 is journaled at 246 in the frame 38 and at its outer end is provided with a gear 248 which ties in with the split shaft 64 leading to the cooling cylinder 62.

In a multicolor arrangement, that is, a press having three, four or five colors and coatings, it is extremely difficult to provide close tolerance accuracy among all the colors. It may therefore be found that the printing plates on one letter press cylinder may be slightly higher than required. This makes it difficult to keep the colors in register. In that case the operator merely presses a button on that particular color releasing the magnet illustrated in FIG. 21 so that that particular platen instead of driving becomes free wheeling and merely acts as a backing for the type cylinder.

The press drive is therefore controlled through a series of magnetic clutches and brakes to provide easy and complete control in all sections of the press. When the press is stopped and "off" printing impression, the brake on the unwind stand is set, the brake on the pyramid draw in rolls is set and the clutch connecting it to the main drive is disconnected. At each printing unit each platen cylinder is in free wheeling position and the clutch 66 connecting the drive with the cooling cylinder is also disconnected. At the opposite end the rewind is also at a standstill locked in position by its independent operating mechanism. Since each platen cylinder is in a fixed position in the frame, it is possible to maintain register because of the free wheeling effect of the platen cylinder which is disconnected from the drive and because of the zoned tension control which maintains a uniform tension throughout all the printing units.

When the press is taken "off" printing impression the gravure or inking cylinder 50 is first moved downwardly out of contact with the transfer cylinder 52 and then the transfer cylinder is moved horizontally out of contact with the web 10. However, before the last movement takes place there is a short delay to permit the transfer cylinder 52 to make a few extra revolutions to clean off the ink by transferring it to the web. Movement of the various cylinders is accomplished by the relative movement between the main frame 38 and the rectangular auxiliary frame 250 which holds the inking unit 42. FIGS. 2, 4, 22, 23 and 24 illustrate the operation of the various adjustments.

Referring to FIG. 4, the base 68 comprises spaced parallel hollow rectangular sections. Mounted on top of each section is a flat trough 252 having shallow sides 254. Extending from the troughs 252 are lugs 256. A plate 258 is mounted in each trough and locked in place by a gear rack 260. Each gear rack 260 comprises an elongated strip mounted on the top of the trough sides 254 overlapping the plate 258. The auxiliary frame 250 is mounted on the plates 258. A traversing shaft 262 extends across the side walls of the frame 250. Mounted at each end of the shaft 262 is a gear 264 meshing with the rack 260. On the operator's side of the press a manually operable wheel 266 turns a shaft 268 having a gear meshing with the gears 264. Rotating movement of the wheel 266 will cause the gears 264 to move along the racks 260 thus pulling the frame 250 back and forth horizontally with the web travel on the plates 258. This movement is for the large adjustment for changing the size of the cylinders.

Figure 22:
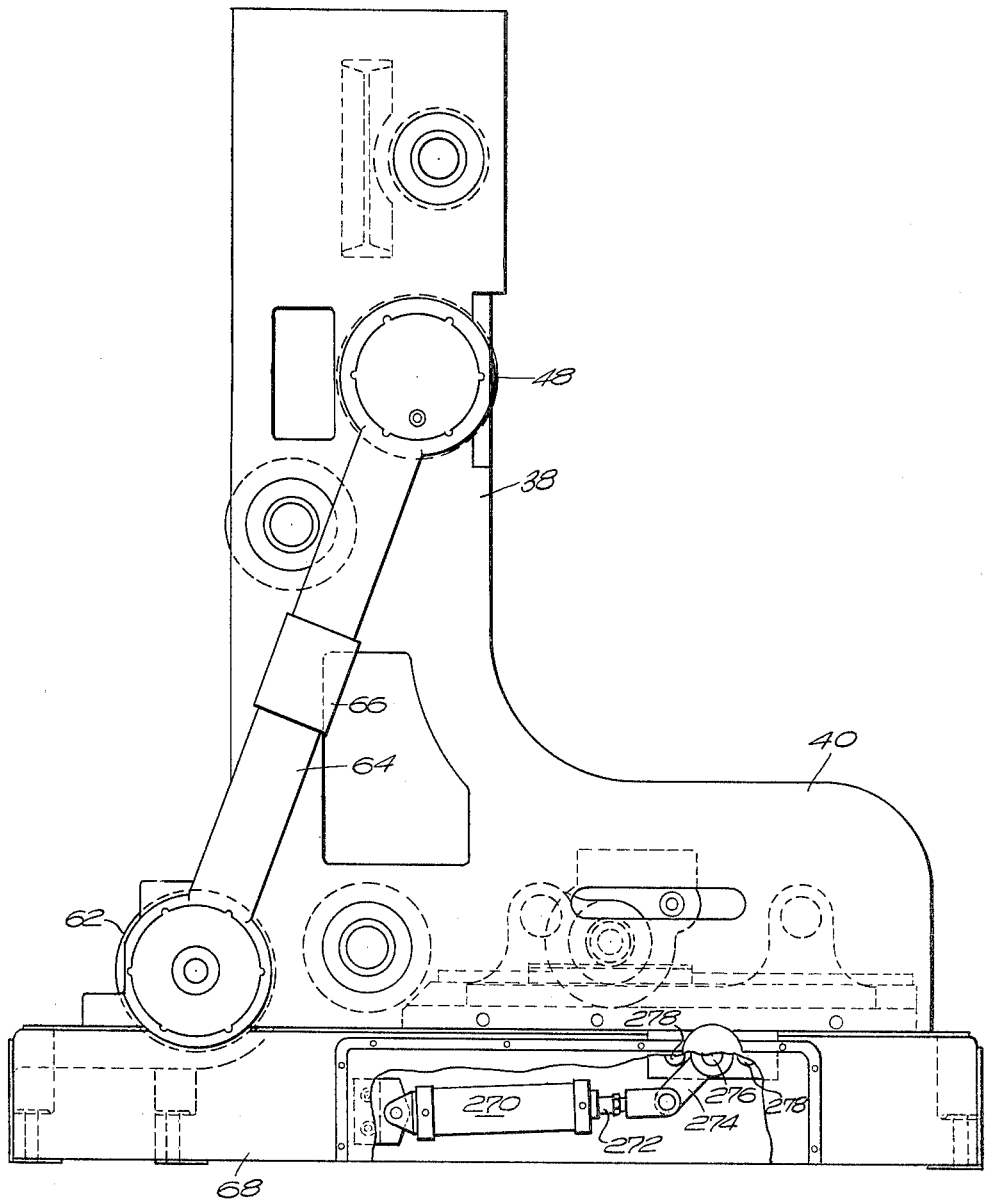
FIG. 22 is a plan view of the L-frame.
Figure 23:
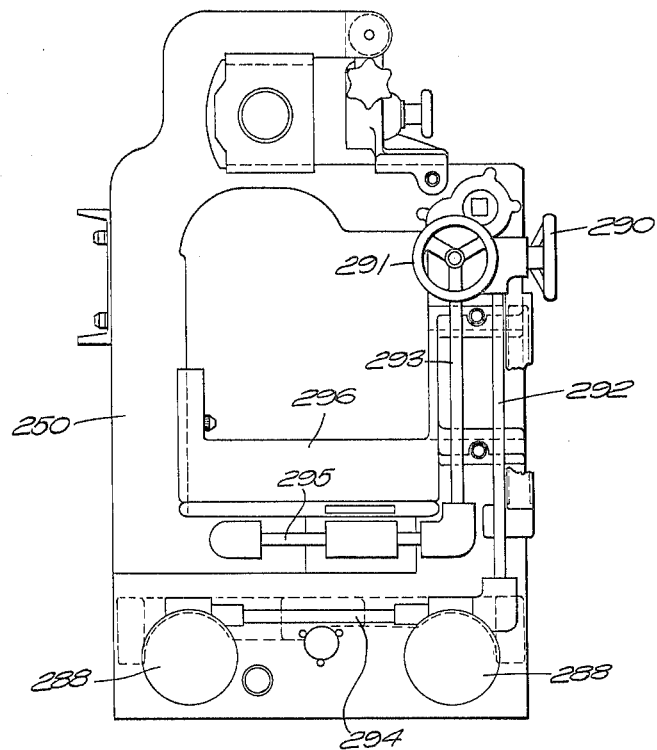
FIG. 23 is a plan view of the auxiliary frame.
Figure 24:
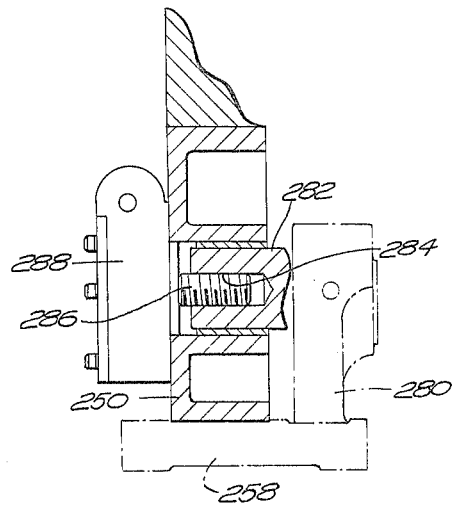
FIG. 24 is a detailed view of the L-frame adjustment.

Referring to FIGS. 4 and 22, the base is provided with an air cylinder 270 having a piston 272 pivotally connected to a lever 274 for turning an impression cam shaft 276 which extends transversely between the lugs 256. Viewing FIG. 22, the cam shaft 276 rides at each end between rollers 278 so that turning movement of the cam will move the lugs 256 and everything mounted back and forth. This movement is no more than approximately $\frac{1}{16}''$. Thus the position of the auxiliary frame 250 on the main frame is handled by the wheel 266 and traversing shaft 268, while the impression is handled by the cylinder 270 and cam shaft 276. The small movement moves the transfer cylinder 52 away from the web 10. In addition to the foregoing the frame 250 can be moved transversely on the plates 258 for lateral print register adjustment. Referring to FIGS. 4, 23 and 24 a stanchion 280 is fixed to one side of each plate 258 and is provided with a horizontal portion 282 having internal threads 284. The frame 250 is provided with a bolt 286 which enters the portion 282, a bolt being operated by a worm and gear arrangement (not shown) in the housing 288. Turning movement of the wheel 290 is transmitted through the vertical shaft 292 to a horizontal shaft 294 which operates spaced worm and gear arrangements in the spaced housings 288 as shown in FIG. 23. As can be seen in FIG. 24 turning movement of the bolt 286 will cause lateral movement of the frame 250 relative to the stanchion 280.

The frame 250 is provided with a carriage 296 which is vertically adjustable and carries the printing unit 42. When going "off" impression the carriage is dropped to separate the plate cylinder 50 from the transfer cylinder 52. As can be seen in FIGS. 2 and 23, an adjustment wheel 291 rotates a vertical shaft 293 which rotates a horizontal shaft 285 just below the carriage 296. A vertical shaft 297 lifts the carriage 296 vertically and is moved by screw threads and a worm arrangement (not shown) operating from the shaft 295. This is for adjustment. When going "off" impression, the screw is turned slightly to drop the carriage about $\frac{1}{16}''$ by means of an air cylinder (not shown).

Thus by providing a main and auxiliary frame which are relatively adjustable and relatively movable for taking the press "on" and "off" printing impression, it is possible to fix the position of the platen and thus retain a preset tension on the web at all times whether the press is running or at a standstill. The free wheeling platen supporting the web allows for the rotating movement of the inking unit cylinders while the press is "off" printing impression.

*Reregister*

The novel web tension control mecahnism hereinabove described coupled with the novel platen and drive hereinabove described permit very accurate color registrations. Furthermore, the preset web tension and fixed platen permit the use of a reregister so that there is practically no waste or scrap when the press is stopped and started. The novel features in the press of the present invention, such as above described, and also the use of a single drive mechanism for all of the color units, permit a simple and accurate reregister to be employed with the press. By the term "reregister" I mean a device which has a memory so that it will retain the position at which the press goes "off" printing impression and will not allow the press to go back "on" printing impression until the type or transfer cylinder has reached the exact same point where it has gone "off" impression. This can be accomplished with a single position clutch device. Such a device locks one side of a clutch at the circumferential position where it went "off" printing impression on the web and does not re-engage the clutch until both sides have reached the exact same position where it has gone "off" impression. Thus the printing will begin at the exact point where it was taken "off" impression.

To accomplish this, the device may be purely mechanically operated or it can be magnetically operated or a combination of an electric eye and a magnetic brake can be used. These devices can be used in combination or subcombination as desired to fit different installations. One method of accomplishing a reregister where the tension is held uniform, the platen is fixed, and all the colors are driven off the same power supply is illustrated in FIGS. 25 to 30 inclusive. It should be understood that the reregister device is fixed to one of the color units to control the "on" printing impression system. Thus since all the color units are printing the same repeat length and are driven from a single source at the same speed and with the same size cylinders, when one unit is in position to go "on" impression then all the other units will also be similarly in position. Therefore the reregister device illustrated in FIGS. 25 to 30 inclusive can be positioned at any one of the color units. Since the first color unit may be used for an undercoating it is better practice to attach the device to the second color unit. The last color unit can also be used for an overcoating and therefore the reregister device should not be positioned on either the first or last color units.

The reregister unit illustrated in FIGS. 25 to 30 inclusive is designed to be positioned on one of the printing cylinders either the transfer 52 or plate cylinder 50. The unit is housed in a housing 298 which may be fastened to the press frame by means of brackets 300 in any desired manner. Connection to the proper cylinder is made by fastening to the end of the cylinder shaft 302 shown in dotted lines in FIG. 25 by means of the plate 304 and flexible coupling 306. Extending from the coupling 306 is a shaft 308 supported in a bearing 310 in the transverse housing wall 312, the opposite end of the shaft 308 being supported in a bearing 314 in the end wall 316 of the housing 298. A collar 318 is fixed to the housing against rotation and surrounds the shaft 308. The collar 318 is separated from the shaft 308 by bearings 320.

An electromagnet 322, annular in shape, is mounted on the collar 318 by bolts 324. A magnetic plate 326 is mounted on the shaft 308 and keyed to the shaft for rotation. The plate 326 is provided with an annular groove 328 into which the magnet 322 extends. With this construction, the magnet 322 is fixed and can be operated at will from the fixed position. The magnetic force is transmitted through the plate 326 which rotates with the shaft 308.

Figure 29:
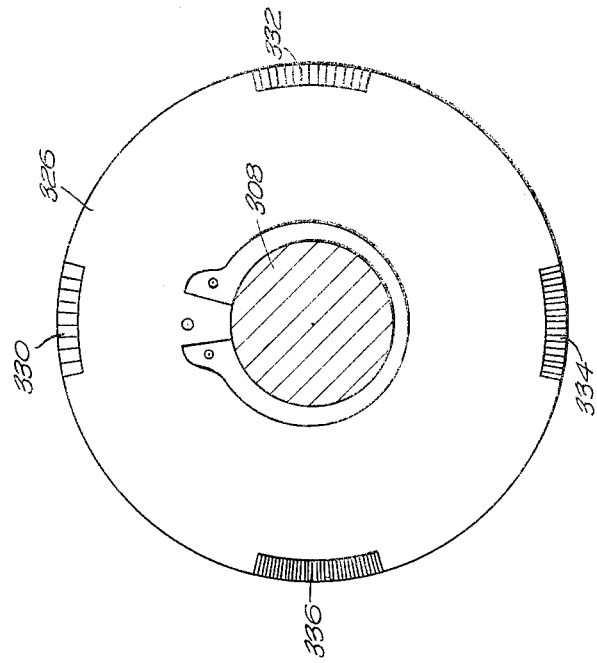
FIG. 29 is a section taken on line 29—29 on FIG. 25.
Figure 30:
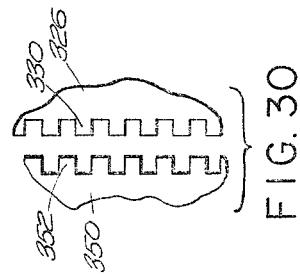
FIG. 30 is a section taken on line 30—30 on FIG. 25.

Now referring to the face of the plate 326 opposite the magnet 322, as shown in FIG. 29 it is provided adjacent the periphery thereof with a series of teeth 330, 332, 334 and 336 positioned equal distance apart on opposite sides of the diameter of the plate 326. Each group of teeth are of different thickness, in the illustrated form the teeth 330 are the thickest, 332 are thinner, 334 are still thinner, and 336 are the thinnest.

Figure 25:
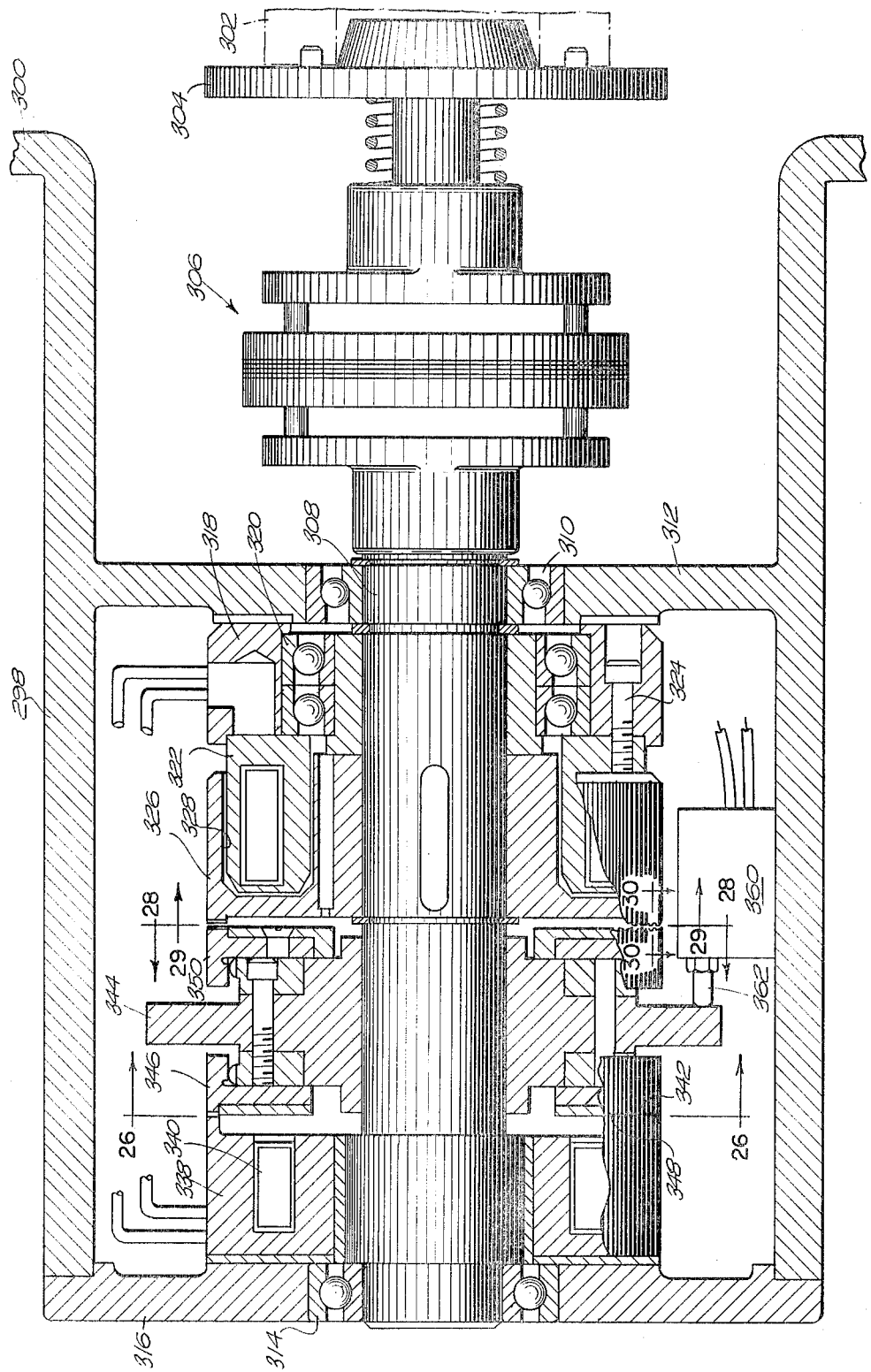
FIG. 25 is a longitudinal section of the magnetic reregister device.
Figure 26:
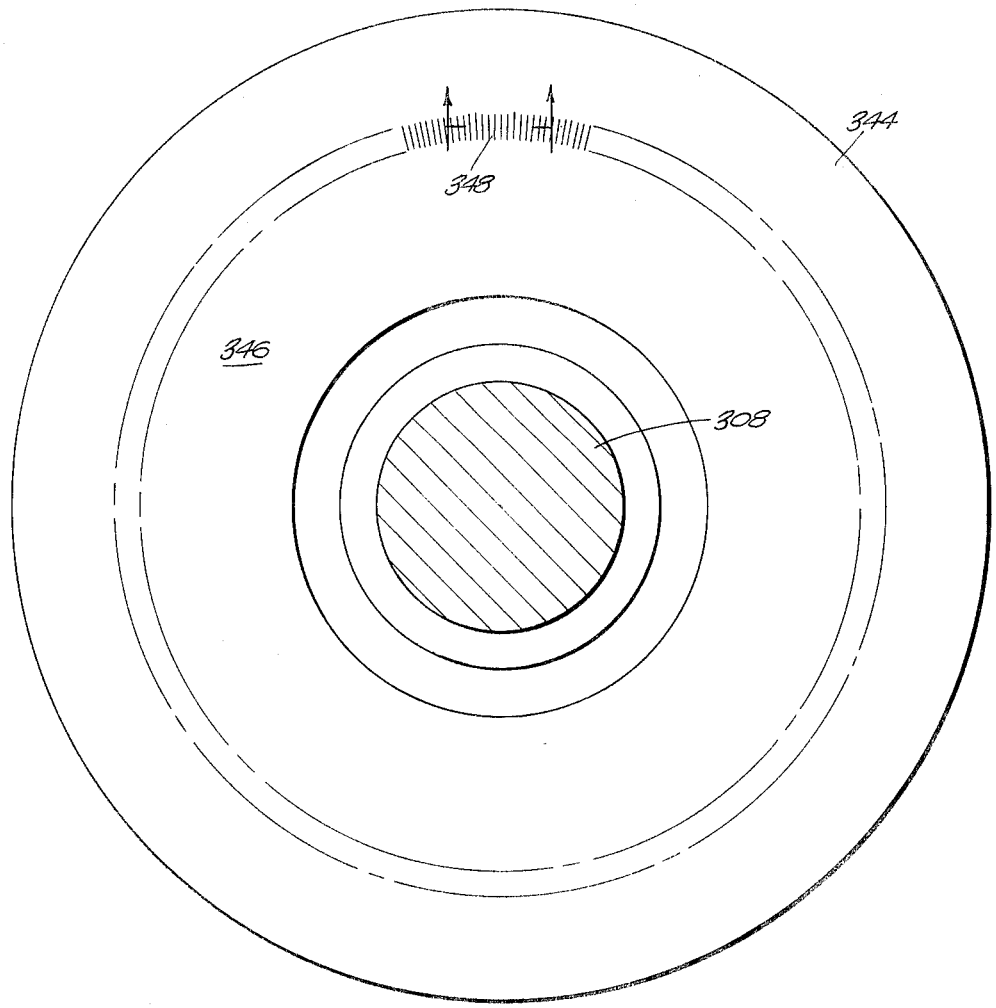
FIG. 26 is a section taken on line 26—26 on FIG. 25.
Figure 27:
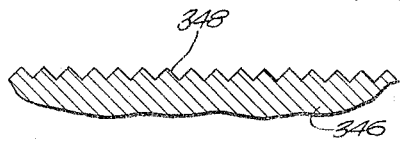
FIG. 27 is a section taken on line 27—27 on FIG. 26.

Now referring to the left end of the housing 298 as viewed in FIG. 25 the housing is provided with a fixed collar 338 housing an electromagnet 340. As shown in FIG. 25, the peripheral edge of the collar 338 is provided with fine teeth 342 coming to a sharp point. I now provide a switch plate 344 which is slidably mounted on the shaft 308. The plate 344 is provided on the surface facing the collar 338 with an auxiliary annular plate 346 having surface teeth 348 identical with the teeth 342 and facing the teeth 342, see FIGS. 25, 26 and 27. On the opposite face of the plate 344 is a second auxiliary plate 350, shown in FIG. 28, and provided with a plurality of openings 352, 354, 356 and 358 at opopsite diameters around the perimeter. The openings 352, 354, 356 and 358 are positioned in the same manner as the teeth 330, 332, 334 and 336 on the plate 326. As illustrated, the openings are of varying size so that the openings 352 take the teeth 330, the openings 354 are designed for the teeth 332, the openings 356 are designed for the teeth 334, and the openings 358 are designed for the teeth 336. With this construction the plates 326 and 350 can only mesh in one circumferential position since the various teeth can only drop into their respective openings of the correct size. Mounted in the housing 298 is a switch 360 having its actuating button 362 extending longitudinally and bearing against the outer surface of the plate 344.

The operation of the reregister is now evident. When the press is running, the magnet 322 magnetizes the plate 326 which draws the plate 344 along the shaft 308 until the plate 350 meshes with the plate 326. In this position the plate 344 is pressing against the switch button 362. When it is desired to take the press "off" printing impression, the press is slowed to a stall position and the "off" button is pressed. Immediately the magnet 322 is shut off and the magnet 340 is turned on pulling the plate 344 away from the plate 326 and towards the collar 338. The teeth 348 and 342 will then mesh while the teeth on the plate 326 will disengage from the openings on the plate 350, and the pressure of the plate 344 on the switch button 362 will be released. The press can then be started up to run the ink agitation system while the press is "off" printing impression. This will continue to rotate the shaft 308 and also the plate 326. However the plate 344 will not rotate as it is locked against the collar 338.

Figure 28:
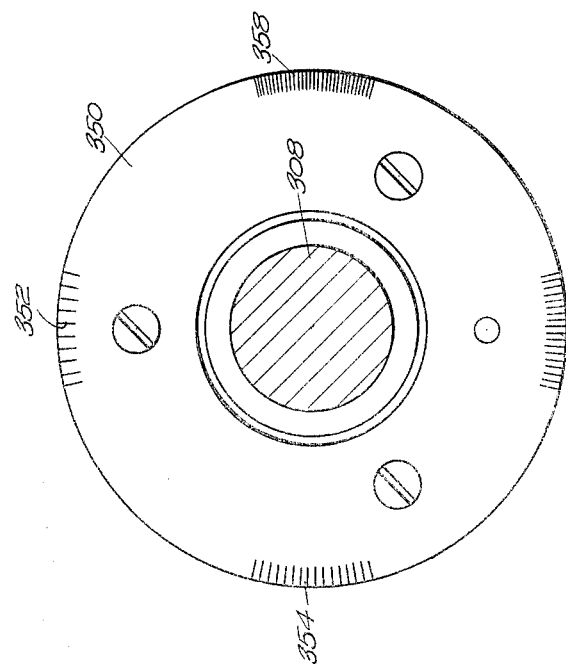
FIG. 28 is a section taken on line 28—28 on FIG. 25.

Now when it is desired to again place the press "on" printing impression, the "on" button is pushed and the magnet 340 shuts off and the magnet 322 is turned on. The plate 344 then moves to the right in FIG. 25 to engage the plate 326. However, the teeth on the plate 326 are just clear of the surface of the plate 350 and the plate 344 cannot move to the right until the proper openings are opposite the teeth in the plate 326. These openings have been locked in their exact circumferential position when the press went "off" impression. Therefore the plate 326 can only mesh with it when the shaft 308 is also in the same position as it was when it went "off" impression. At this point the plate 344 will be pulled over to the plate 326 and the switch 360 will be actuated to throw the press "on" printing impression. This procedure ensures the press going "on" impression at the same circumferential position that it went "off" impression. The plates 326 and 350, as illustrated in FIGS. 28 and 29 therefore constitute a single position clutch, since they can only mesh in a single position. Since the plate 344 is held fast in the position in which the press went "off" impression by the collar 338 and the plate 326 cannot mesh with it until it has returned to that position, the press can only go "on" impression in the same position where it went off originally. Note that the spacing is such that the teeth 342 and 348 remain meshed until the openings on the plate 350 mesh with the teeth on the plate 326.

The above construction thus permits a press to go "on" printing impression at the exact circumferential position that it went "off" impression. However, it should be noted that it is essential that the web be held in the position that it was in when the press was originally stopped and taken "off" impression. Therefore, if the platen cylinder were allowed to move in any manner, it would negative the reregister. The press of the present invention is provided with a fixed position platen which with its free wheeling effect permits the main drive shaft to continue rotating while the web is held in the exact position that it went "off" impression. Furthermore, the zoned tension control ensures that the web be held on the proper preset tension throughout the press. The reregister device hereinabove described coupled with the fixed platen and zoned tension control therefore permits a great deal of accuracy in putting the press "on" printing impression in the exact spot that it went off.

The single position clutch can also be manually operated as shown in FIGS. 31 and 32. In this form the housing 364 is mounted on the press frame by brackets 366 and is coupled with one of the printing cylinders by connecting the shaft 368 in any desirable manner as for example as shown in FIG. 25. As the shaft 368 enters the frame 364 from the right as viewed in FIG. 32. a plate 370 is keyed to the shaft and rotatable therewith. The plate 370 is provided with openings 372 adjacent the periphery thereof. Beyond the plate 370 the shaft 368 narrows at 374 and is held in a bearing 376 in a wall of the housing 364. A second plate 376 is mounted on the narrow portion of the shaft, and is provided with pins 380 adapted to enter the openings 372 in the plate 370. The plate 378 has a hub collar 382 which extends along the narrow portion of the shaft 374 almost to the rear wall of the housing 364. Between the back end of the collar 382 and the rear wall of the housing, the shaft 374 is surrounded by a coil spring 384 which tends to bias the plate 378 towards the plate 370. Intermediate the ends of the housing 364 is a fixed housing wall portion 386 through which the shaft 374 and collar 382 pass. Viewing FIG. 32, the right hand edge of the wall portion 386 is provided with an annular portion 388 having perimeter teeth 390, and the left hand face of the plate 370 is provided with similar teeth 392. The teeth 390 and 392 provide locking face portions.

Back of the wall 386 and between the wall 386 and the bearing 376, the collar portion 382 is provided with a grooved wheel 394. A yoke 396 with a handle 398 is mounted around the wheel 394. The yoke 396 is pivoted at a point to one side of the houisng 364 at 400 and is provided with pins 402 which enter the groove in the wheel 394. The free end of the handle 398 rides over a switch 404 at the side of the housing 364, and the switch 404 is provided with an operating lever 406 which extends through an opening 408 in the handle 398.

With the parts assembled as above described, the rotation of the press will cause rotation of the shaft 368 and of its reduced portion 374. The plate 370, which is keyed to the shaft 368 will also rotate together with the plate 378 and its collar 382. The plate 378 is connected to the plate 370 by the pins 380 entering the holes 372. Now when the press is taken "off" printing impression, it is first brought to a stall. At this point the handle 398 is manually operated to the left in FIG. 32. This pulls the plate 378 to the left away from the plate 370 so that the pins 380 are pulled out of the openings 372. It simultaneously also moves the plate 378 rearwardly so that the teeth 390 and 392 are meshed and the plate 378 can no longer rotate. It also simultaneously throws the switch 404 which signals the operating console to throw the press "off" impression. The power can then be started up so that the printing cylinders will continue to rotate to keep the ink in a fluid condition. In the meantime, because of the fact that the plates 370 and 378 are no longer meshed with each other, the plate 370 will rotate with the shaft 368, but the plate 378 will remain locked against the face of the wall portion 388.

When it is desired to return the press "on" printing impression, the handle 398 is moved to the right moving the plate 378 away from its locking surface with the wall portion 388. However, the plate 378 cannot move and mesh with the plate 370 until the openings in the plate 370 have turned to the same position as the pins in the plate 378. This is the position in which the press went "off" printing impression. Therefore, as soon as the openings 372 are in circumferential alignment with the pins 380 the plates 370 and 378 will mesh with each other and this will move the switch 404 sufficiently to put the press immediately "on" impression. I have thus provided a completely manual assembly for reregistering the impression when the press goes "on" or "off" impression.

Figure 33:
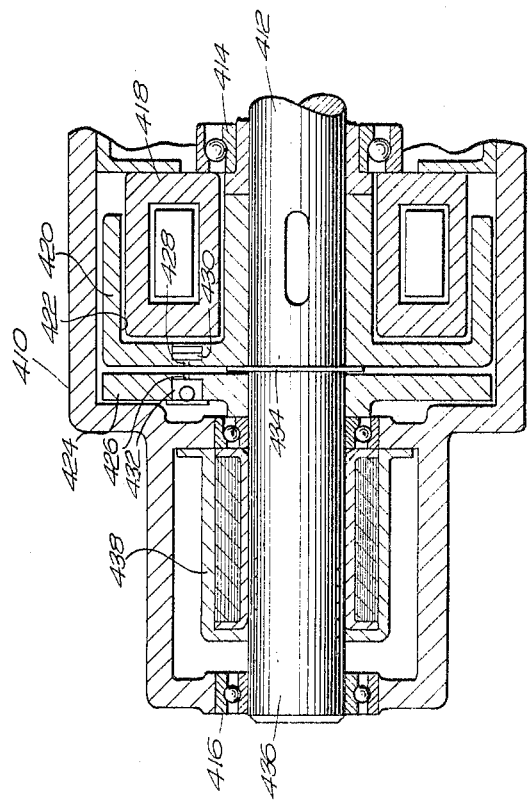
FIG. 33 is a longitudinal section of the electrical reregister device.

This can also be accomplished with the use of an electric eye to determine the exact circumferential position of the aligned plates. For example, referring to FIG. 33, a housing 410 is mounted on the press frame and is provided with a shaft 412 which is coupled to the printing cylinder shaft as in the form shown in FIG. 25. The shaft 412 is supported in bearings 414. The shaft 412 is split at 434, and the split portion 436 is supported in bearings 416. Fixed to the housing 410 is an electromagnet 418. A plate 420 is keyed to the shaft 412 and is provided with an annular groove 422 into which the magnet 418 extends. Beyond the plate 420 is a second plate 424 which is mounted on the split portion 436 of the shaft and faces the plate 420 as shown in FIG. 33. The plates 420 and 424 are provided at one point circumferentially with a pair of aligned slots 426 and 428. The plate 420 is provided with a small housing 430, and the plate 424 is provided with a small housing 432. One of the housings 430 or 432 contains a tiny source of light and the opposite housing contains a photoelectric cell. The light operates the photoelectric cell only when the slots 426 and 428 are opposite each other as illustrated in FIG. 33.

Surrounding the split shaft portion 436 is an electric brake 438 bolted to the housing. In operation, when the press is "on" printing impression, the brake 438 is off and the magnet 418 is on. The magnet 418 transmits its magnetism through the plate 420 to lock the plate 424 to the plate 420 so that it rotates with it in the position shown in FIG. 33. Now when it is desired to take the press "off" printing impression, the operator slows the press to a stall position and presses the "off" impression button. This extinguishes the light in the housings 430 or 432, this also shuts off the magnet 418 and puts on the brake 438 to lock the plate 424 in its circumferential position. Now when the press is again picked up to a speed for agitating the ink, the plate 420 will continue to rotate, while the plate 424 and shaft 436 is held by the brake 438. When the press is put "on" impression, the "on" button is pushed and the light in the housing 430 will go on. However, nothing happens until the plate 420 is in the same circumferential position as the plate 424, at which point the slots 426 and 428 are aligned and the electric eye is actuated. The brake 438 shuts off and the magnet 418 goes on, locking the plates in the position shown in FIG. 33 for simultaneous rotation again.

Thus, with the use of a reregister, a different type of procedure must be used for placing the press "on" and "off" printing impression. Normally this can be done while the press is running. However, with a reregister the press stop procedure is a little different. The operator uses the slow button to decelerate the press from running speed to a so-called creeping speed. The minimum creeping speed of the press of the present invention is two inches per second or ten feet a minute. The instant the press reaches creeping speed the inking or gravure cylinder 50 drops out of contact with the transfer cylinder 52. Also, the gas fire goes out in the oven, and the air recirculating blower stops after thirty seconds. The transfer cylinder 52, completes two additional revolutions to transfer the remaining ink while the operator is reducing creeping speed to a press stop, then when the stop is indicated, the operator pushes a stop button which disengages the reregister programing clutch and locks the memory side in position, as hereinabove described. At the same time the disengaging action of the clutch sends a signal which locks the feed rolls to prevent the web from creeping, unlocks all driven web carrier cylinder clutches, and moves the transfer cylinder 52 away from web 10. The operator then pushes the agitate button which starts the ink agitating. At this point the type or transfer cylinder 52 and inking or plate cylinder 50 are rotating and the agitation of the ink is all taking place. The main shaft is running, but the web is at a standstill and all the locked points are in locked position disengaged from the main drive.

To start the press, the agitation is stopped, and the press is started to creep speed. A push button is then depressed to unlock the memory side of the clutch. The memory side of the clutch being in a holding position waits until the press creeps into reregister position and then the clutch reengages as hereinabove described. This unlocks the web feed rolls, starts the hot air circulating fan, starts the gas flame after a ten second interval, engages all the clutches to that the web at creep speed and closes the printing and and inking impressions. Then, with the fast button, the operator accelerates the printing speed at ten feet a second acceleration.

The inking system

The press of the present invention is also equipped with a novel inking arrangement illustrated in FIGS. 2, 4, 6 to 8 inclusive, and 34 to 40 inclusive. Modern high speed presses are equipped with all sorts of devices for handling different types of materials at high speeds and for registering and imprinting different colors. However, the so-called down time on a given press for changing jobs or colors or both is a major factor in determining costs. The press of the present invention is provided with a removable inking system and storage reservoir which reduces the down time of the press to a minimum. This is accomplished by making ready the new color cylinders away from the press and merely rolling out the old and rolling in the new job.

The ink pan of the present invention serves as a storage reservoir and is generally rectangular in shape as illustrated in FIGS. 35 and 36. The pan 440 may be ribbed for strength and is provided with supporting blocks 442 at each side edge. The back edge of each of the blocks 442 is arcuately cut out at 444 to accommodate the bearing for the gravure or inking cylinder 50. Inside of both side walls of the pan 440 are spaced parallel horizontal rails 446 illustrated in FIGS. 37 and 39 on which supporting blocks 448 ride.

Figure 37:
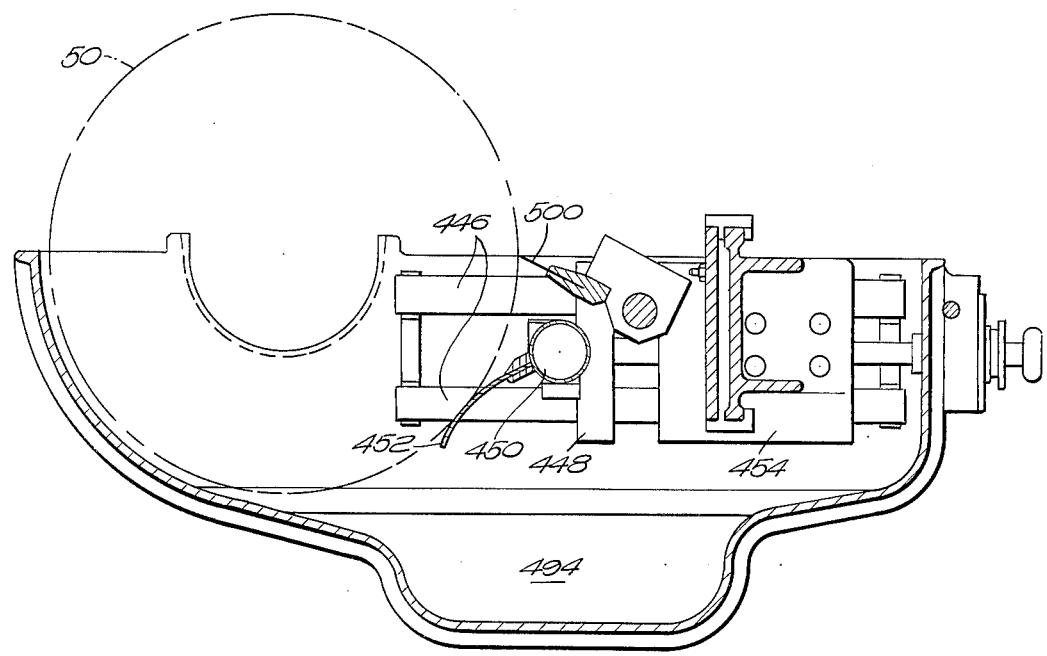
FIG. 37 is a transverse section of the ink reservoir.

The blocks 448 are small and support an ink feed pipe 450 extending transversely across the ink pan as shown in FIG. 35. Extending forwardly from the pipe 450 is a flexible forwardly extending portion forming a flexible ink trough 452. As illustrated in FIG. 37, the ink trough 452 contacts the cylinder 50 adjacent its lower edge. The length of the ink trough 452 is less than the width of the cylinder 50 so that the excess ink at the trough can run out at each end and back into the ink pan 440. The pipe 450 is frictionally retained in the blocks 448 to hold its radial position. Changes in the size and position of the cylinder 50 will necessitate adjustment of the angle of the pipe 450 manually and the position of the pipe 450 by the construction illustrated in FIGS. 35 and 39.

Adjacent to the block 448, is a large block 454 which supports the doctor blade mechanism. The block 454 is provided with a horizontal axial opening 456 extending from the left end in FIG. 39 inwardly to a point just short of the right end leaving a wall portion 458. A hollow tube 460 is slidably mounted in the opening 456 and is provided with internal threads 462. The left end of the tube 460 is frictionally fastened to the smaller block 448. A cylinder 464 having external threads is positioned in the tube 460 and meshes with the threads 462 as shown in FIG. 39. The cylinder 464 is provided with a narrow portion 466 which is locked to a rod 468 extending to the right through the tube 460. The rod 468 extends to the right through the large block 454 through the wall of the inking pan and out to a knob 470. It is thus evident that when the knob 470 is rotated, it will rotate the cylinder 464 which in turn is threadedly engaging the tube 460 and forces the tube 460 to slide to the left or right depending on the direction of rotation. This causes the block 448 to move horizontally to adjust the position of the pipe 450 and the trough 452.

The right side of the large block 454 is provided with an opening 472 through which the rod 468 passes. I now provide a second tube 474 which forms a shaft surrounding the rod 468 and is externally threaded. The external threads on the tube 474 engage threads in the opening 472 in the large block. The tube 474 extends to the left in FIG. 39 through the tube 460 and surrounds the narrow portion 466 of the cylinder 464. In addition, the external threads on the tube 474 are meshing with the internal threads 462 of the tube 460. Rotation of the tube 474 will therefore cause the large block 454 to slide horizontally and will also cause the tube 460 and the block 448 to which it is connected to also move horizontally. Therefore, rotation of tube 474 moves both blocks 448 and 454 simultaneously. Rotation of the rod 468 by its knob 470 changes the relative position of the blocks. A thrust collar 476 surrounds the tube 474 adjacent the outside housing to prevent movement of the tube relative to the ink pan. The tube 474 narrows at the right end and is not equipped with any external threads. At this point it extends to a point just short of the knob 470.

Now viewing FIGS. 39 and 40, a gear 478 is slidably mounted on the shaft 474 and is rotatable by a worm 480 mounted above it at a right angle to the shaft 474. The worm 480 is rotatable by means of a manually operated wheel 482 mounted at one side and toward the front of the ink pan as illustrated in FIGS. 35 and 36. The wheel 482 and the worm 480 is mounted on a shaft 484 which extends across the front of the ink pan to a duplicate arrangement at the right end of the ink pan as viewed in FIG. 35 where it is attached to a similar worm and gear arrangement. Rotation of the wheel 482 and shaft 484 will cause rotation of the worm 480 at each side end of the ink pan. Rotation of the worm 482 will cause rotation of the gears 478. However, the gears 478 are not connected to the shaft 474 and can rotate freely. The right hand face of each gear 478 is therefore provided with a plurality of extending clutch pins 486 which are adapted to fit into slots in the annular clutch member 488 surrounding the shaft 474. The clutch member 488 is keyed to the shaft 474 at 490. A spring 492 normally urges the clutch member towards the left into engagement with the pins 486. Now with this arrangement when the hand wheel 482 is rotated and the worm gear arrangement rotates, the gear drives the clutch member to the pins 486 and the clutch member being keyed to the shaft 474 causes rotation of the shaft. Therefore turning movement of the wheel 482, as viewed in FIG. 35, causes simultaneous movement of both ends of the blocks 448 and 454 causing the doctor blade and the trough to move simultaneously either forward or rearwardly in the ink pan. When it is desired to make a relative adjustment between the blocks 448 and 454, the operator grabs the knob 470 and simultaneously grasps the clutch member 488 and pulls it towards the right against the knob. This disconnects the worm drive and the larger adjustment from the shaft 474. Turning movement of the knob 470 then makes only one adjustment and that is the small block 448 which moves relative to the large block 454.

In the inking arrangement of the present invention the inking cylinder 50 does not rotate in the ink and the excess ink actually is positioned in a storage reservoir below the level of the cylinder in the portion 494 of the pan 440 as shown in FIG. 37. A gear pump 496 is driven by a flexible shaft 498, as shown in FIG. 4. The pump 496 circulates the ink through a filter 497 from the bottom of the pan 440 to the pipe 450 where it is sprayed in a jet stream along the length of the pipe through suitable openings against the cylinder 50. The old and new inks form a circulating puddle between the flexible ink trough 452 and the cylinder 50. To doctor blade 500 contacts the cylinder 50 above the flexible trough 452 as shown in FIG. 37. Thus the ink is sprayed against the surface of the cylinder 50 between the trough 452 and the doctor blade 500, from where the surplus ink cascades down over the face of the rotating cylinder into the trough 452 to form a rotating puddle.

Figure 38:
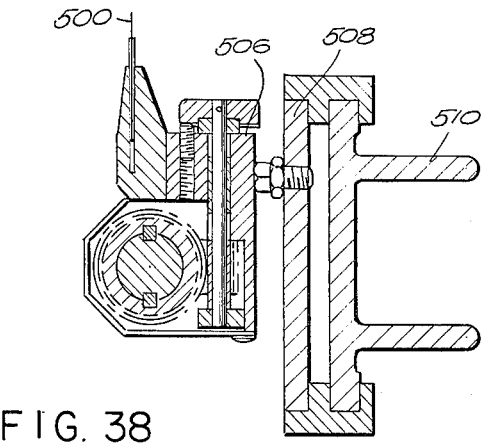
FIG. 38 is a section of the doctor blade assembly and mounting.
Figures 41, 42:
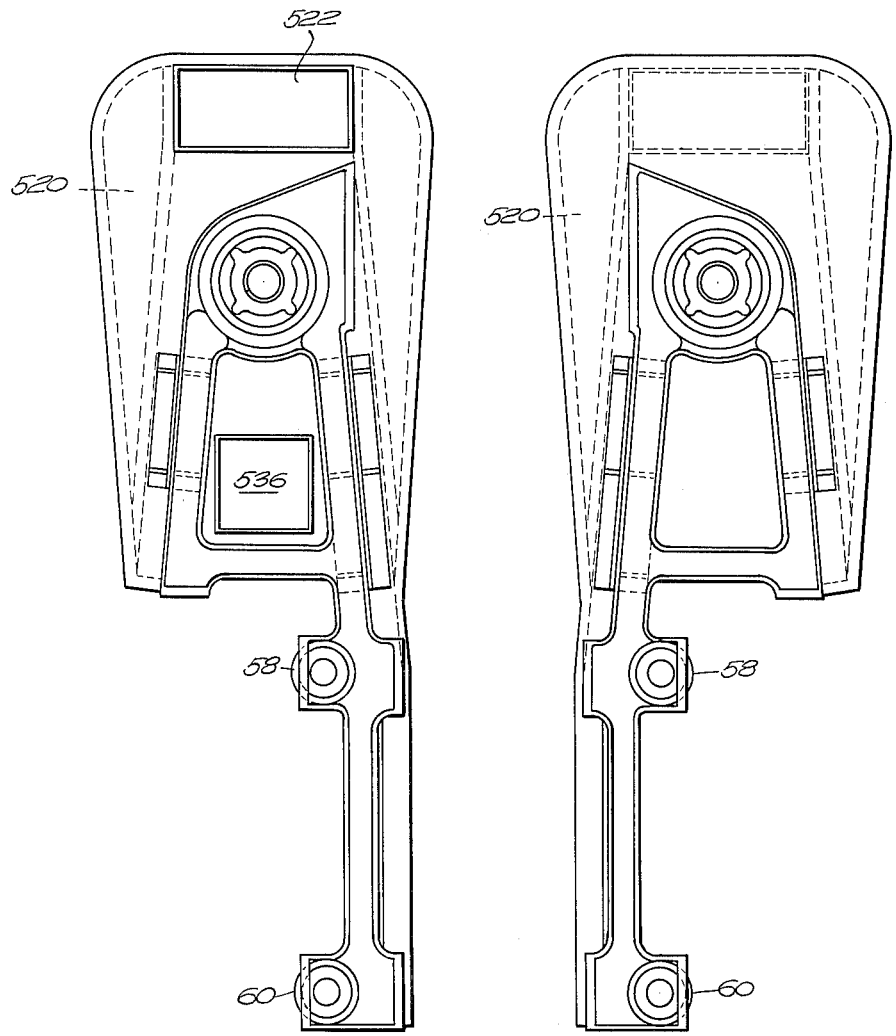
FIG. 41 is a side elevation of the drying unit taken from the drive side.
FIG. 42 is a side elevation of the drying unit taken from the operator's side.

The doctor blade 500 is mounted as illustrated in FIGS. 35, 37 and 38. In FIG. 38 the doctor blade is shown in vertical position which it must assume to permit the cylinder 50 to be removed or replaced in the pan. After the cylinder 50 is in place the position of the doctor blade 500 is controlled by the adjustment hereinabove described. Radial position of the doctor blade is controlled by the air cylinders 502. The front of the pan 440 is also provided with an air cylinder 504 which controls the reciprocation of the doctor blade 500. Referring to FIGS. 37 and 38 it will be noted that the doctor blade 500 is mounted on a plurality of brackets 506 riding on a bar 508. A bridge 510 supports the unit to permit adjustment and reciprocation.

Figure 34:
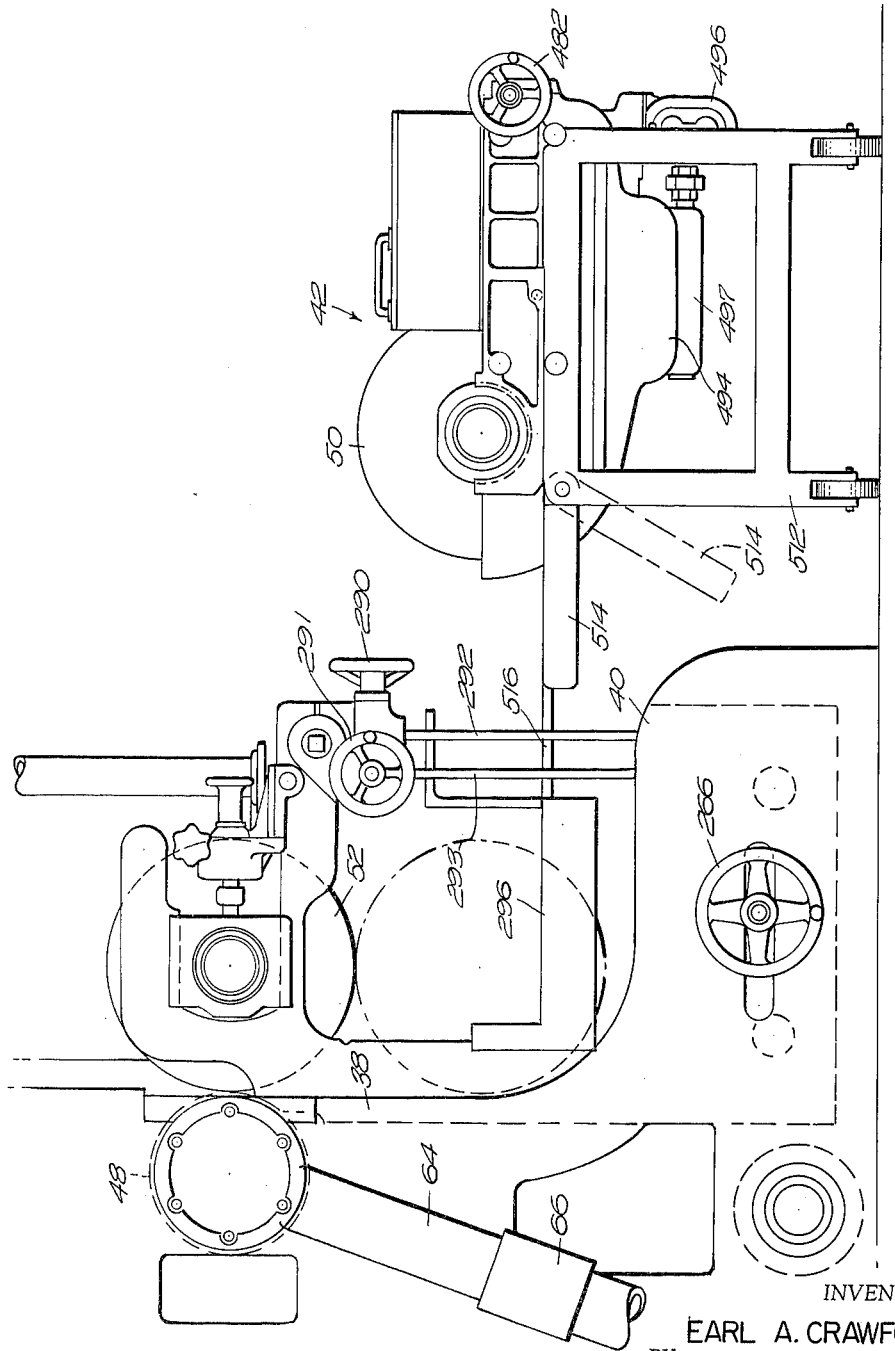
FIG. 34 is a side elevation showing the removal of the inking unit.

Now referring to FIG. 34, it is contemplated that a cart 512 be provided which will fit between the various printing units with its front end 514 designed to lock to a shelf 516 in the auxiliary frame 250. The carriage 296 supports the supporting blocks 442 so that the inking unit 42, together with the cylinder 50 can be slipped out of the press on to the cart 512 and rolled away and a new unit pushed into place as illustrated in the dotted lines in FIG. 34. The carriage 296 is raised or lowered as required to properly position the ink pan 440 and the cylinder 50 carried thereby as shown in FIGS. 2, 6, 7 and 8. The adjustment of the height and horizontal position of the inking pan to compensate for different sizes of cylinders and for different printing methods is discussed herein in conjunction with the mechanism for going "on" and "off" printing impression. However, it should be noted that in going "off" impression, the inking pan is first dropped to separate the inking cylinder 50 from the transfer cylinder 52, and the transfer cylinder 52 is allowed one or two more rotations to remove the excess ink therefrom before the entire auxiliary frame 250 is moved away from the platen cylinder 48 to take press "off" impression. This arrangement leaves the cylinder 52 clean at all times and permits quick changes and removal of the inking pan.

*Drying oven and combustion chamber*

Each printing unit is an island in itself and is provided with its own means for drying the web. The drying units of the present invention are designed with two compartments, the first compartment forming a drying oven through which the web passes. This section is fitted with suitable air jets arranged in series across the web which convects hot, vapor free air on to the traveling web counter to the web movement in a manner that causes a rotary surface scrubbing action. The second compartment, to one side, collects the solvent vapor laden air from the web compartment through a series of connecting exhaust ports at a higher volume and pressure rate than is required in the drying compartment. This causes a negative pressure in the drying section. The exhaust ports are located to progressively remove the solvent vaporized air from each individual jet area so that solvent vapor does not mix with the new conditioned air in the drying area.

The hot solvent laden air is then progressively drawn from the second compartment through a gas burner combustion chamber by the exhaust side of an air feed blower. This progressive air rotating action converts the solvent vapor into heat energy, supplies the drying chamber with a continuous flow of dry non-contaminated air, and practically eliminates the explosion hazard.

Figure 43:
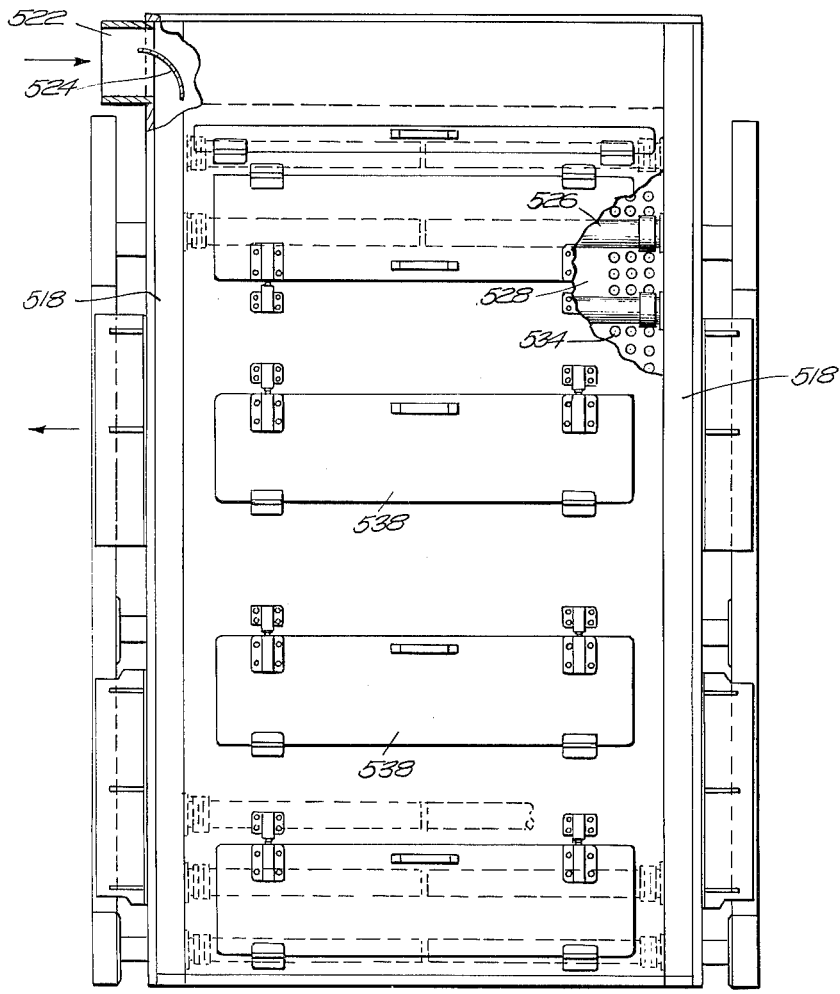
FIG. 43 is a plan view of the back of the drying unit.

The oven of the present invention is more particularly illustrated as attached to the printing unit in FIGS. 2, 4, and 5 and particularly in more detail in FIGS. 41 to 48 inclusive. The first section or compartment is illustrated in FIGS. 41 to 45, FIG. 41 illustrating the drive side and FIG. 42 the operator's side of the compartment as it is attached to the printing unit as shown in FIG. 2. The web 10 enters the compartment by leaving the platen cylinder 48 and then swinging upwardly over the roller 54 and then downwardly over the idler rollers 58 and 60, and over the cooling cylinder 62. The outer portion of the first compartment is generally rectangular in shape as shown in FIG. 43, the side walls 518 being of double thickness to form inlet ducts at each side. The upper ends of the inlet ducts are enlarged at 520 to obtain a full flow of air. Air enters at the upper end in the inlet duct 522 under the urging of the circulating pumps hereinafter to be described with relation to the second compartment. The duct 522 is provided with a baffle 524 which directs a portion of the air flow down the near side duct as shown in FIG. 43, the rest of the air flowing across to the opposite wall portion. The warm clear air is now forced downwardly at the side walls on each side.

Figure 44:
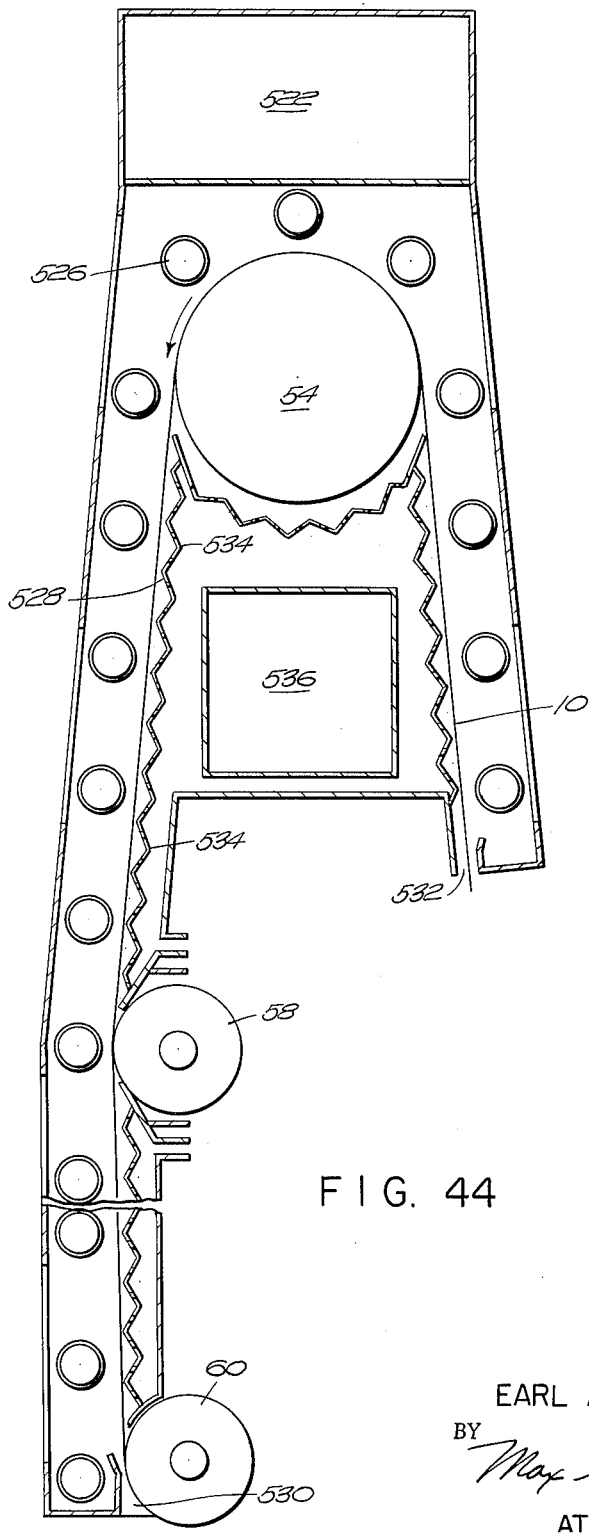
FIG. 44 is a vertical section of the drying unit.

Now viewing FIGS. 43 and 44, the warm air enters a plurality of spaced jet pipes 526 extending across the width of the compartment in spaced parallel relation. In the illustrated form there are eighteen such pipes. Spaced inwardly from the pipes 526, is a corrugated wall 528 which in effect forms a closed compartment with the outer wall of the unit. The corrugated wall portion starts at the bottom of the short wall, extends upwardly then arcuately beneath the idler roller 54, then downwardly to the bottom end leaving spaces for the idler rollers 58 and 60 to impinge into the compartment, and an exit opening 530 at the bottom end. The web enters the short wall at the opening 432, swings upwardly around the idler roller 54, down over the idler roller 58, and then outwardly at 530 over the idler roller 60. As it passes the jet pipes 526, these are provided with elongated slots which blast the warm air over the surface of the web in a direction in which the web is moving from the short end up to the idler roller 54, and against the movement of the web from the idler roller 54 down to the exit 530.

Figure 45:
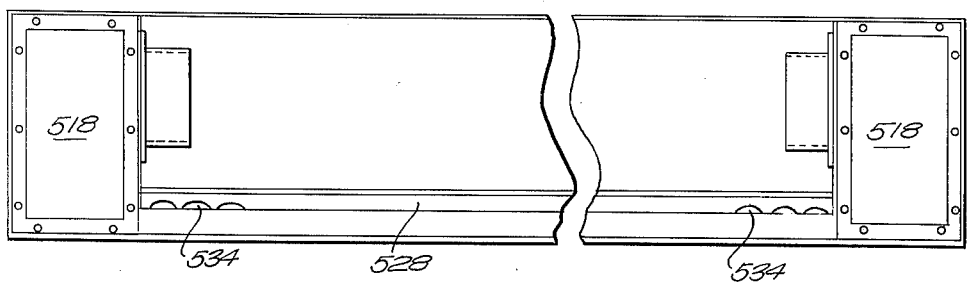
FIG. 45 is a transverse section of the drying unit.

Cool air has a tendency to enter with the web 10 at the entrance 532, and to enter contrary to the movement of the web 10 at the exit 530. This movement of cool air into the drying chamber is caused by the negative pressure within the chamber hereinafter to be described. The effect is to provide a lukewarm zone at the entrance 532 so that the surface of the web is warmed gradually until it reaches the idler roller 54. This prevents surface hardening of the impression and permits drying in depth. The action of the cool air entering at the exit 530 has a tendency to start cooling the surface of the web even before it leaves the drying chamber and reaches the cooling cylinder 62. The inflowing air is also the source of the oxygen necessary to support the combustion in the combustion chamber. Circulation of the air is accomplished by providing a plurality of exhaust ducts 534 extending along the inner wall of the unit adjacent the side edges as illustrated in FIGS. 43 and 45. The exhaust ducts 534 permit the exhaust blowers to draw the solvent laden air immediately away from the surface of the web at each side edge. From here it is drawn into the main exhaust duct 536. Examining FIG. 43, the outer wall of the chamber is provided with a plurality of openings 538 for threading the web 10 and for cleaning and adjusting.

Figure 46:
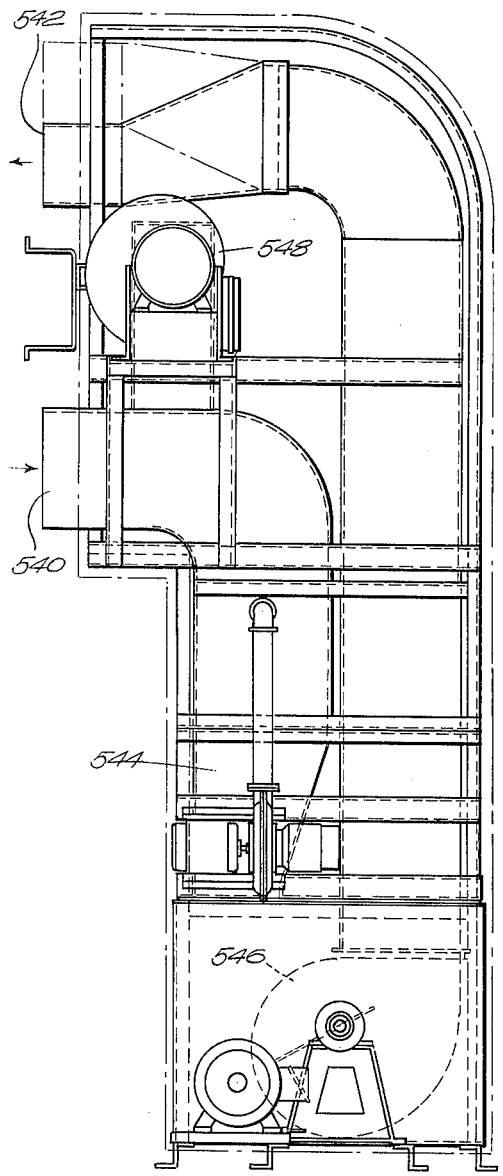
FIG. 46 is a side elevation of one side of the combustion chamber.
Figure 47:
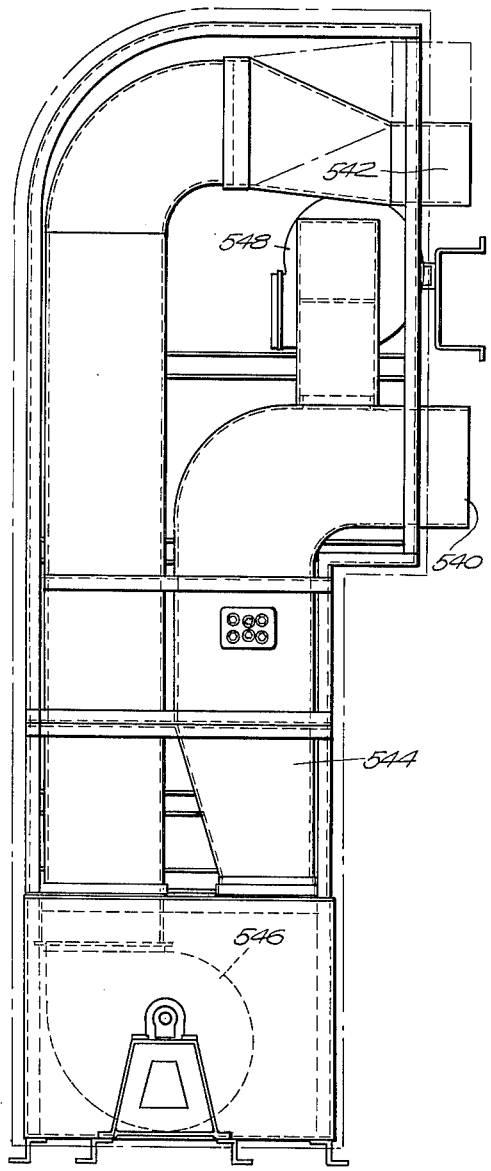
FIG. 47 is an elevation of the other side of the combustion chamber.
Figure 48:
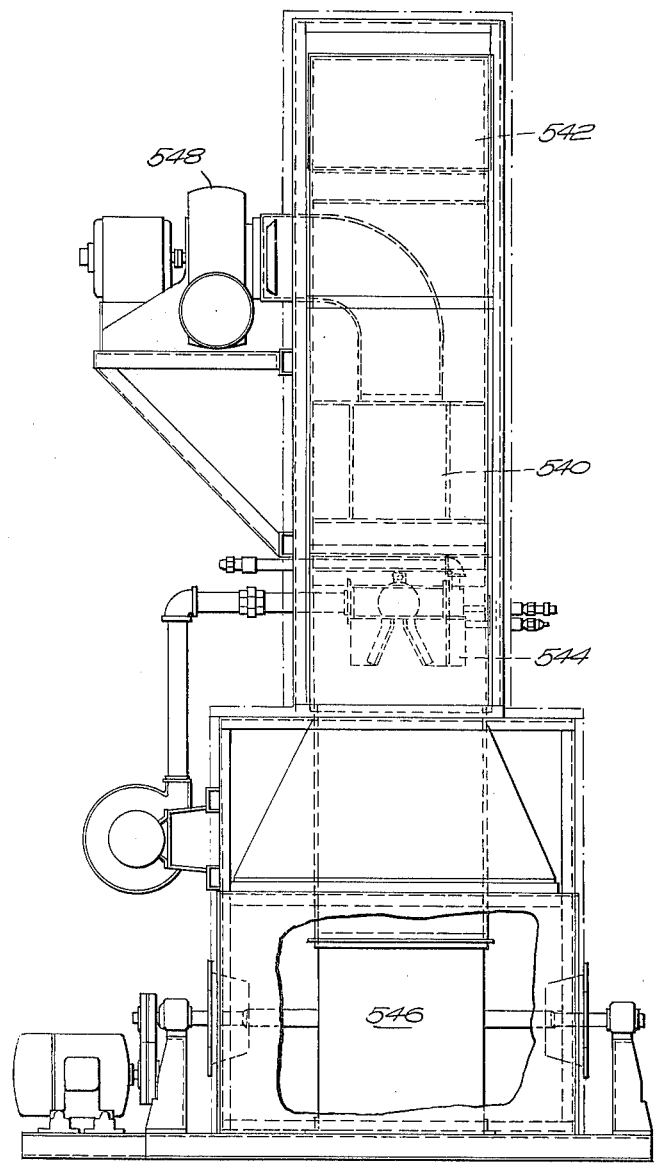
FIG. 48 is a front view of the combustion chamber.

Now referring to FIGS. 46, 47 and 48, the second compartment or combustion chamber is positioned adjacent the drying chamber and is provided with a pair of ducts, the lower duct 540 exhausting the solvent laden air from the drying oven and the upper duct 542 blowing the fresh warm air into the drying oven. As the air is drawn from the drying oven through the duct 540 it must pass downwardly through the combustion chamber portion 544 which provides a controlled gas and air flame mixture which covers the entire interior diameter of the chamber. This forms a flame filter through which all the air must pass. Thus all impurities are burnt out including any bacteria so that the air recirculated through the drying chamber is not contaminated in any way.

Now the main recirculation is done by the pump 546 at the bottom of the chamber. This pump blows the hot air upwardly and out through the duct 542. However, intermediate the ducts 540 and the combustion chamber 544 there is an auxiliary circulating pump 548. This auxiliary pump 548 exhausts approximately up to thirty-three percent of the solvent laden air out into the atmosphere. For example, the large pump at the bottom circulates the hot air through the combustion chamber at approximately 5000 cubic feet per minute into the drying chamber through the duct 542 and the combined pumps 546 and 548 are drawing 6500 cubic feet per minute through the exhaust duct 540, the negative pressure created in the drying oven drags cool fresh air through the openings 530 and 532 in the drying chamber at each end. This action accomplishes the necessary cooling of the web leaving the chamber, makes the heating of the web at a gradual rate, and keeps adding fresh air which is drawn through the flame for purification.

Figure 49:
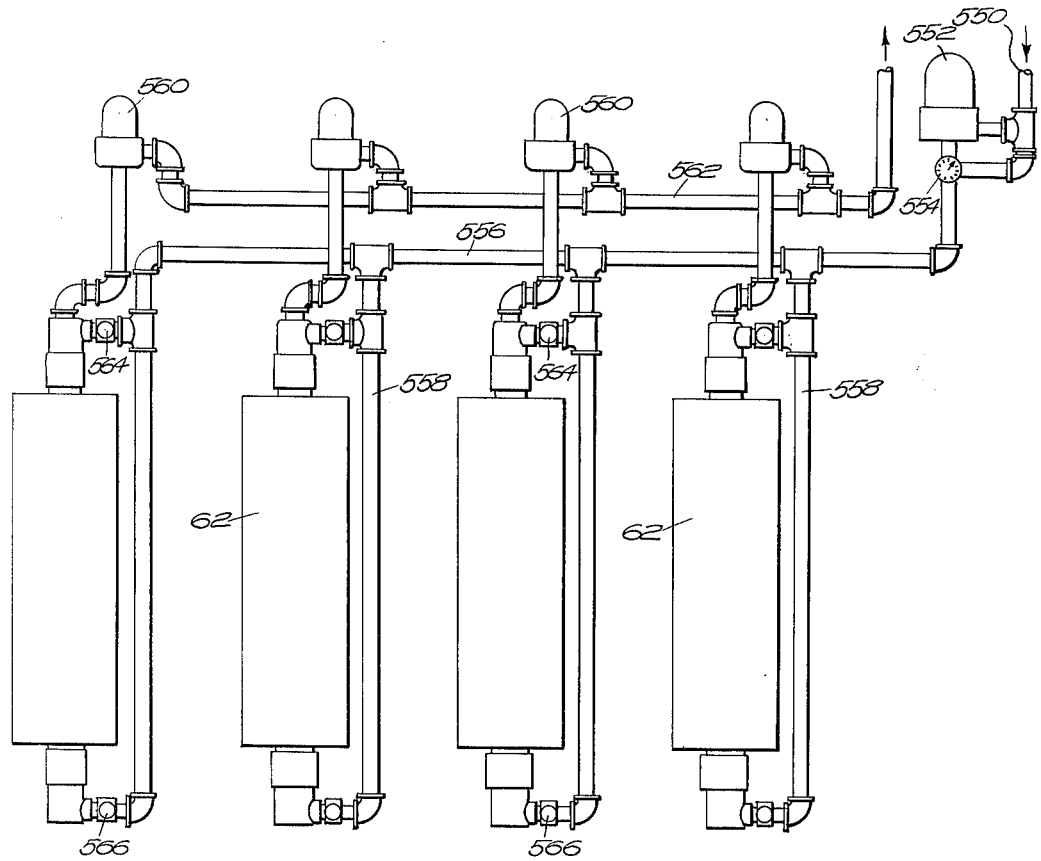
FIG. 49 is a piping layout of the cooling cylinders.

The drying chamber and combustion chamber combined at each unit makes each printing unit a self-sufficient station. Now in addition to the drying action, which is purely a surface action, the web 10 should be cooled between color stations to prevent a buildup of heat at the end of a plurality of color printing operations. This is accomplished by passing the web over a cooling cylinder 62 at the lower end of the unit. Each cylinder 62 is driven by a shaft 64 and clutch 66 from the platen cylinder 48. Each cylinder 62 is a water cooled cylinder which is controlled by circulating the water at the proper temperature from a thermostatically controlled pump system. This is illustrated in FIG. 49. It is contemplated that in any given press the various printing and coating stations will all be provided with identical cooling cylinders 62. For the purposes of illustration the cylinders are illustrated as close together at four stations, assuming the press having four color stations. In actual constructions the cylinders 62 will be much further apart. However, it is contemplated that for uniformity the hook-up of the cylinders 62 be as follows:

The cooling liquid enters at the point 550 from a conventional heat exchanger unit (not shown herein) which cools the liquid to the desired temperature. A supply pump 552, controlled by a pressure regulator and gage 554, is provided with enough capacity to service all four of the cylinders 62. As illustrated, the flow is from the gage 554 through a pipe 556 and sub pipes 558. At each cylinder 62, the sub pipes 558 connect both ends of the cooling cylinders 62. Each cooling cylinder 62 is also provided with a suction pump 560 returning the cooling liquid to a common pipe 562 connected to the supply or reservoir (not shown). Regulator valves 564 and 566 at each end of the cylinders 62 permit the cooling liquid to be circulated through or to bypass the cylinders 62 as desired.

From the various printing units, the web is then passed to the rewind end through the various cutters and slitters which may be of conventional construction. I have thus provided a modern high speed efficient press having many novel features not heretofore used in a press of this type. The press of the present invention is equipped with a zoned tension control unit which permits accurate control of the tension on the web in the unwind, rewind and the printing zones independently of each other. Furthermore, this principle can be applied to other types of installations. The press of the present invention is also provided with a novel impression control mechanism which includes the free wheeling platen. This provides for a novel method of taking the press "on" and "off" printing impression without moving the platen. In effect the platen is in a fixed position and only its relationship to the drive shaft is controlled by a magnetic clutch. The fixed platen and zoned tension control permit highly accurate registry controls on multicolor jobs.

Furthermore, with the web so completely controlled as to position and tension, the press may be equipped with applicant's novel reregister. This reregister which is illustrated as a single position clutch and can be either manual, electronic or magnetic, as illustrated, permits the web to go "on" printing impression at the exact spot where it went "off" printing impression, thus eliminating a great deal of waste in succeeding converting operations. The novel inking unit of the present invention also permits very rapid changes in the jobs and cuts down the down time of the press to an absolute minimum. Cleaning the press and changing colors or jobs is thus a simple matter since the make ready can be done separately while the press is still running on the previous job. Applicant's novel drying and combustion unit also help to make the speed of the press possible. This unit is designed to run economically by converting the solvent laden air to B.t.u. in the combustion chamber.

Various other construction features have been touched upon in the above description. Other advantages of the present invention will be readily apparent to a person skilled in the art.

I claim:

1. A rotary cylinder type web printing press comprising means for supporting and unwinding a web of material, means for rewinding said web of material, a plurality of spaced, self-contained printing units aligned between said unwinding and said rewinding means, said web passing through said units, means independent of said printing units and positioned between said press and said unwinding means for pulling said web from said unwinding means, and means independent of said printing units and positioned between said press and said rewinding means for pulling said web from said unwind pulling means through said printing units, said unwinding, pulling and rewinding constituting separate tension zones, and means for maintaining a preset tension on said web in each of said zones regardless of the movement of said web or the printing condition of said units, each of said printing units having a platen cylinder in a fixed position mounted on a driven shaft, and means for disconnecting said cylinder from said shaft to provide a freely rotating effect and to permit said pulling means to maintain its preset tension when said web is motionless and said press is "off" impression, means for moving a printing cylinder to or away from said platen cylinder to go "on" or "off" impression, said printing units having a reregister device for moving the printing cylinder "on" printing impression only in the same circumferential position from where it moved "off" printing impression whereby the fixed position of said platen cylinder permits operation of said reregister device and said zoned tension control.

2. A rotary cylinder type web printing press comprising means for supporting and unwinding a web of material, means for rewinding said web of material, a plurality of spaced, self-contained printing units aligned between said unwinding and said rewinding means, said web passing through said units, means independent of said printing units and positioned between said press and said unwinding means for pulling said web from said unwinding means, and means independent of said printing units and positioned between said press and said rewinding means for pulling said web from said unwind pulling means through said printing units, said unwinding, pulling and rewinding constituting separate tension zones, and means for maintaining a preset tension on said web in each of said zones regardless of the movement of said web or the printing condition of said units, each of said printing units having a platen cylinder in a fixed position mounted on a driven shaft, and means for disconnecting said cylinder from said shaft to provide a freely rotating effect and to permit said pulling means to maintain its preset tension when said web is motionless and said press is "off" impression, said means including a magnetic clutch between said platen cylinder and said shaft.

3. A rotary cylinder type web printing press comprising means for supporting and unwinding a web of material, means for rewinding said web of material, a plurality of spaced, self-contained printing units aligned between said unwinding and said rewinding means, said web passing through said units, means independent of said printing units and positioned between said press and said unwinding means for pulling said web from said unwinding means, and means independent of said printing units and positioned between said press and said rewinding means for pulling said web from said unwind pulling means through said printing units, said unwinding, pulling and rewinding constituting separate tension zones, and means for maintaining a preset tension on said web in each of said zones regardless of the movement of said web or the printing condition of said units, each of said printing units having a platen cylinder in a fixed position mounted on a driven shaft, and means for disconnecting said cylinder from said shaft to provide a freely rotating effect, and to permit said pulling means to maintain its preset tension when said web is motionless and said press is "off" impression, means for moving a printing cylinder to or away from said platen cylinder to go "on" or "off" impression, said printing units having a reregister device for moving the printing cylinder "on" printing impression only in the same circumferential position from where it moved "off" printing impression, said reregister including a single position clutch, and means for locking said clutch in a fixed circumferential position when going "off" printing impression whereby the fixed position of said platen cylinder permits operation of said reregister device and said zoned tension control.

4. In a rotary cylinder type web printing press having means for supporting and unwinding a web of material, means for rewinding said web of material, a plurality of spaced, self-contained printing units aligned between said unwinding and said rewinding means, said web passing through said units, a web control for controlling the tension of said web regardless of the movement of said web or the printing condition of said units comprising means independent of said printing units and positioned between said press and said unwinding means for pulling said web from said unwinding means, and means independent of said printing units and positioned between said press and said rewinding means for pulling said web from said unwind pulling means through said printing units, said unwinding, pulling and rewinding constituting separate tension zones, said unwind pulling means including three cylinders arranged in pyramid form for pulling said web from the unwind stand and for separating the preset tension between said unwinding and pulling zones, and means for operating a brake on said unwinding web in response to a tension control device, each of said printing units having a platen cylinder in a fixed position mounted on a driven shaft, and means for disconnecting said cylinder from said shaft to provide a freely rotating effect and to permit said pulling means to maintain its preset tension when said web is motionless and said press is "off" impression, said means including a magnetic clutch between said platen cylinder and said shaft.

5. An apparatus for feeding a web of material through a processing machine under tension, comprising an unwind stand for supporting a web of material coiled on a shaft, means for pulling said web from said unwind stand, a second pulling means for pulling the web from said first pulling means through a processing machine, a rewind stand for rewinding said web, and means for maintaining a preset tension on said web between said unwind stand and said first pulling means, and means for maintaining a preset tension on said web between said second pulling means and said rewind stand including a differential drive for said second pulling means, a spider in said differential drive having a vertical shaft, a brake on said shaft, said brake being operable from a pressure sensing roller, said web passing over said roller.

6. An apparatus for feeding a web of material through a processing machine under tension, comprising an unwind stand for supporting a web of material coiled on a shaft, means for pulling said web from said unwind stand, a second pulling means for pulling the web from said first pulling means through a processing machine, a rewind stand for rewinding said web, and means for maintaining a preset tension on said web between said unwind stand and said first pulling means, said pulling means each comprising a pair of vertically spaced driven rollers, an idler roller mounted in horizontally slidable bearings in offset relation between said driven rollers, said web being threaded around said rollers whereby tension on said web will pull said idler roller against said driven rollers, the rollers on said second pulling means being oversize as compared to the rollers on said first pulling means.

7. An apparatus for feeding a web of material through a processing machine under tension, comprising an unwind stand for supporting a web of material coiled on a shaft, means for pulling said web from said unwind stand, a second pulling means for pulling the the web from said first pulling means through a processing machine, a rewind stand for rewinding said web, and means for maintaining a preset tension on said web between said unwind stand and said first pulling means, and means for maintaining a preset tension on said web between said second pulling means and said rewind stand including a differential drive for said second pulling means, a spider in said differential drive having a vertical shaft, a brake on said shaft, said brake being operable from a pressure sensing roller, said web passing over said roller, said unwind tension means including a brake on said unwind shaft, a pressure sensing roller, said web passing over said roller between said unwind stand and said first pulling means, and means for applying the brake on said shaft when the tension on said roller is less than a preset tension.

8. An apparatus for feeding a web of material through a processing machine under tension, comprising an unwind stand for supporting a web of material coiled on a shaft, means for pulling said web from said unwind stand, a second pulling means for pulling the web from said first pulling means through a processing machine, a rewind stand for rewinding said web, and means for maintaining a preset tension on said web between said unwind stand and said first pulling means, and means for maintaining a preset tension on said web between said first and second pulling means and through the processing machine, and means for maintaining a preset tension on said web between said second pulling means and said rewind stand including a differential drive said second pulling means, a spider in said differential drive having a vertical shaft, a brake on said shaft, said brake being operable from a pressure sensing roller, said web passing over said roller.

9. An apparatus for feeding a web of material through a processing machine under tension, comprising an unwind stand for supporting a web of material coiled on a shaft, means for pulling said web from said unwind stand, a second pulling means for pulling the web from said first pulling means through a processing machine, a rewind stand for rewinding said web, and means for maintaining a preset tension on said web between said unwind stand and said first pulling means, and means for maintaining a preset tension on said web between said first and second pulling means and through the processing machine, and means for maintaining a preset tension on said web between said second pulling means and said rewind stand including a differential drive for said second pulling means, a spider in said differential drive having a vertical shaft, a brake on said shaft, said brake being operable from a pressure sensing roller, said web passing over said roller, said first and second pulling means dividing said web into three independent and unrelated tension zones between said unwind stand and said rewind stand.

10. An apparatus for feeding a web of material through a rotary cylinder type web printing press having a plurality of spaced printing units under tension, comprising an unwind stand for supporting a web of material coiled on a shaft, means independent of the printing units and positioned between said unwind stand and the processing machine for pulling said web from said unwind stand, a second pulling means independent of the printing units for pulling the web from said first pulling means through a rotary cylinder type web printing press, a rewind stand for rewinding said web, and means for maintaining a preset tension on said web between said unwind stand and first pulling means, and means for maintaining a separate preset tension on said web between said first and second pulling means and through the printing press, and means for maintaining a separate preset tension on said web between said second pulling means and said rewind stand including a differential drive for said second pulling means, a spider in said differential drive having a vertical shaft, a brake on said shaft, said brake being operable from a pressure sensing roller, said web passing over said roller said first and second pulling means dividing said web into three independent and unrelated tension zones between said unwind stand and said rewind stand, said first and second pulling means being driven from a single source of power and said rewind stand being operated by an independently driven tension winding device.

11. An apparatus for feeding a web of material through a processing machine under tension, comprising an unwind stand for supporting a web of material coiled on a shaft, means for pulling said web from said unwind stand, a second pulling means for pulling the web from said first pulling means through a processing machine, a rewind stand for rewinding said web, and means for maintaining a preset tension on said web between said unwind and said first pulling means, and means for maintaining a preset tension on said web between said first and second pulling means and through the processing machine, and means for maintaining a preset tension on said web between said second pulling means and said rewind stand, said pulling means each comprising a pair of vertically spaced driven rollers, an idler roller mounted in horizontally slidable bearings in offset relation between said driven rollers, said web being threaded around said rollers whereby tension on said web will pull said idler roller against said driven rollers, the rollers on said second pulling means being oversize as compared to the rollers on said first pulling means.

12. An apparatus for feeding a web of material through a processing machine under tension, comprising an unwind stand for supporting a web of material coiled on a shaft, means for pulling said web from said unwind stand, a second pulling means for pulling the web from said first pulling means through a processing machine, a rewind stand for rewinding said web, and means for maintaining a preset tension on said web between said unwind stand and said first pulling means, said first and second pulling means dividing said web into three independent and unrelated tension zones between said unwind stand and said rewind stand, said pulling means each comprising a pair of vertically spaced driven rollers, an idler roller mounted in horizontally slidable bearings in offset relation between said driven rollers, said web being threaded around said rollers whereby tension on said web will pull said idler roller against said driven rollers, the rollers on said second pulling means being oversize as compared to the rollers on said first pulling means.

13. An apparatus for feeding a web of material through a processing machine under tension, comprising an unwind stand for supporting a web of material coiled on a shaft, means for pulling said web from said unwind stand, a second pulling means for pulling the web from said first pulling means through a processing machine, a rewind stand for rewinding said web, and means for maintaining a preset tension on said web between said unwind stand and said first pulling means, said first and second pulling means being driven from a single source of power and said rewind stand being operated by an independently driven tension winding device, said pulling means each comprising a pair of vertically spaced driven rollers, an idler roller mounted in horizontally slidable bearings in offset relation between said driven rollers, said web being threaded around said driven rollers whereby tension on said web will pull said idler roller against said driven rollers, the rollers on said second pulling means being oversize as compared to the rollers on said first pulling means.

14. An apparatus for feeding a web of material through a processing machine under tension, comprising an unwind stand for supporting a web of material coiled on a shaft, means for pulling said web from said unwind stand, a second pulling means for pulling the web from said first pulling means through a processing machine, a rewind stand for rewinding said web, and means for maintaining a preset tension on said web between said unwind stand and said first pulling means, said last named means including a brake on said unwind shaft, a pressure sensing roller, said web passing over said roller between said unwind stand and said first pulling means, and means for applying the brake on said shaft when the tension on said roller is less than a preset tension, said pulling means each comprising a pair of vertically spaced driven rollers, an idler roller mounted in horizontally slidable bearings in offset relation between said driven rollers, said web being threaded around said rollers whereby tension on said web will pull said idler roller against said driven rollers, the rollers on said second pulling means being oversize as compared to the rollers on said first pulling means.

15. An apparatus for feeding a web of material through a processing machine under tension, comprising an unwind stand for supporting a web of material coiled on a shaft, means for pulling said web from said unwind stand, a second pulling means for pulling the web from said first pulling means through a processing machine, a rewind stand for rewinding said web, and means for maintaining a preset tension on said web between said unwind stand and said first pulling means, and means for maintaining a preset tension on said web between said second pulling means and said rewind stand including a differential drive for said second pulling means, a spider in said differential drive having a vertical shaft, a brake on said shaft, said brake being operable from a pressure sensing roller, said web passing over said roller, said pulling means each comprising a pair of vertically spaced driven rollers, an idler roller mounted in horizontally slidable bearings in offset relation between said driven rollers, said web being threaded around said rollers whereby tension on said web will pull said idler roller against said driven rollers, the rollers on said second pulling means being oversize as compared to the rollers on said first pulling means.

16. An apparatus for feeding a web of material through a processing machine under tension, comprising an unwind stand for supporting a web of material coiled on a shaft, means for pulling said web from said unwind stand, a second pulling means for pulling the web from said first pulling means through a processing machine, a rewind stand for rewinding said web, and means for maintaining a preset tension on said web between said unwind stand and said first pulling means, and means for maintaining a preset tension on said web between said first and second pulling means and through the processing machine, and means for maintaining a preset tension on said web between said second pulling means and said rewind stand, said first and second pulling means dividing said web into three independent and unrelated tension zones between said unwind stand and said rewind stand, said pulling means each comprising a pair of vertically spaced driven rollers, an idler roller mounted in horizontally slidable bearings in offset relation between said driven rollers, said web being threaded around said rollers whereby tension on said web will pull said idler roller against said driven rollers, the rollers on said second pulling means being oversize as compared to the rollers on said first pulling means.

17. An apparatus for feeding a web of material through a processing machine under tension, comprising an unwind stand for supporting a web of material coiled on a shaft, means for pulling said web from said unwind stand, a second pulling means for pulling the web from said first pulling means through a processing machine, a rewind stand for rewinding said web, and means for maintaining a preset tension on said web between said unwind stand and said first pulling means including a brake on said unwind shaft, a pressure sensing roller, said web passing over said roller between said unwind stand and said first pulling means, and means for applying the brake on said shaft when the tension on said roller is less than a preset tension, said first and second pulling means dividing said web into three independent and unrelated tension zones between said unwind stand and said rewind stand, said pulling means each comprising a pair of vertically spaced driven rollers, an idler roller mounted in horizontally slidable bearings in offset relation between said driven rollers, said web being threaded around said rollers whereby tension on said web will pull said idler roller against said driven rollers, the rollers on said second pulling means being oversize as compared to the rollers on said first pulling means.

18. An apparatus for feeding a web of material through a processing machine under tension, comprising an unwind stand for supporting a web of material coiled on a shaft, means for pulling said web from said unwind stand, a second pulling means for pulling the web from said first pulling means through a processing machine, a rewind stand for rewinding said web, and means for maintaining a preset tension on said web between said unwind stand and said first pulling means including a brake on said unwind shaft, a pressure sensing roller, said web passing over said roller between said unwind stand and said first pulling means, and means for applying the brake on said shaft when the tension on said roller is less than a preset tension, said first and second pulling means being driven from a single source of power and said rewind stand being operated by an independently driven tension winding device, said pulling means each comprising a pair of vertically spaced driven rollers, an idler roller mounted in horizontally slidable bearings in offset relation between said driven rollers, said web being threaded around said rollers whereby tension on said web will pull said idler roller against said driven rollers, the rollers on said second pulling means being oversize as compared to the rollers on said first pulling means.

References Cited by the Examiner

UNITED STATES PATENTS

| | | | |
|---|---|---|---|
| 1,021,051 | 3/1912 | Lathey | 101—153 |
| 1,301,072 | 4/1919 | Mascord | 101—247 |
| 1,341,442 | 5/1920 | Silvius | 74—777 |
| 1,427,602 | 8/1922 | Kaiser | 226—183 X |
| 1,451,726 | 4/1923 | Zuckermann | 101—153 |
| 1,878,904 | 9/1932 | Smith | 101—181 |
| 1,952,913 | 3/1934 | Dickhaut | 242—75.43 |
| 2,136,683 | 11/1938 | Gochoel | 101—219 |
| 2,268,988 | 1/1942 | Hess et al. | 101—416 |
| 2,283,501 | 5/1942 | Huck | 270—5 |
| 2,429,338 | 10/1947 | Adams | 34—122 |
| 2,432,828 | 12/1947 | Stone | 226—183 X |
| 2,462,558 | 2/1949 | Scheuermann et al. | 242—75.43 |
| 2,549,605 | 4/1951 | Huck | 101—181 |
| 2,659,162 | 11/1953 | Katz | 34—122 |
| 2,723,620 | 11/1955 | Huck | 101—181 |
| 2,925,035 | 2/1960 | Crawford | 101—181 |
| 2,950,674 | 8/1960 | Taylor et al. | 101—247 |
| 3,032,245 | 5/1962 | George et al. | 226—39 |
| 3,141,202 | 7/1964 | Linnert et al. | 226—24 |

DAVID KLEIN, *Primary Examiner.*

ROBERT E. PULFREY, EUGENE R. CAPOZIO,
*Examiners.*

HARLEIGH EWELL, *Assistant Examiner.*